US012732587B2

(12) United States Patent
Mizoguchi et al.

(10) Patent No.: US 12,732,587 B2
(45) Date of Patent: Sep. 8, 2026

(54) IMAGE PROCESSING APPARATUS AND CONTROL METHOD THEREOF

(71) Applicant: CANON KABUSHIKI KAISHA, Tokyo (JP)

(72) Inventors: Yoshinori Mizoguchi, Tokyo (JP); Akitoshi Yamada, Kanagawa (JP); Kouta Murasawa, Kanagawa (JP); Fumino Matsui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 18/602,872

(22) Filed: Mar. 12, 2024

(65) Prior Publication Data

US 2024/0314259 A1 Sep. 19, 2024

(30) Foreign Application Priority Data

Mar. 14, 2023 (JP) ................................ 2023-039880

(51) Int. Cl.
*H04N 1/60* (2006.01)
*G06K 15/10* (2006.01)

(52) U.S. Cl.
CPC ......... *H04N 1/6075* (2013.01); *G06K 15/102* (2013.01)

(58) Field of Classification Search
None
See application file for complete search history.

(56) References Cited

U.S. PATENT DOCUMENTS 6,016,359 A * 1/2000 Komatsu ................. G06T 11/10 358/518
7,801,355 B2 * 9/2010 Arazaki ................ G06T 3/4015 348/237
2003/0095272 A1 * 5/2003 Nomizu ............ H04N 1/32561 358/1.9
2005/0264836 A1 * 12/2005 Gotoh .................. H04N 1/6019 358/1.9
2007/0279657 A1 * 12/2007 Kishimoto ............ H04N 1/603 358/1.9

(Continued)

FOREIGN PATENT DOCUMENTS

JP H07203234 A 8/1995
JP 2020027948 A 2/2020

*Primary Examiner* — Abderrahim Merouan
*Assistant Examiner* — Pawan Dhingra
(74) *Attorney, Agent, or Firm* — Canon U.S.A., Inc. IP Division

(57) ABSTRACT

An image processing apparatus obtains image data; obtains first color conversion information applicable to the image data; divides the image data into a plurality of region data; corrects the first color conversion information to generate second color conversion information; and applies, to each of the plurality of region data, color conversion processing based on one of the first color conversion information and the second color conversion information. If a color difference between a third color and a fourth color obtained by converting a first color and a second color based on the first color conversion information is smaller than a predetermined color difference, a color difference between a fifth color and a sixth color obtained by converting the first color and the second color based on the second color conversion information is larger than the predetermined color difference.

15 Claims, 16 Drawing Sheets

(56) References Cited

U.S. PATENT DOCUMENTS

2010/0165412 A1* 7/2010 Aihara ................. H04N 1/6019
358/3.23
2010/0321737 A1* 12/2010 Nakatani .............. G06K 15/107
358/1.9
2011/0013205 A1* 1/2011 Hansaki ................... H04N 1/52
358/1.8
2012/0188609 A1* 7/2012 Kuno ................... H04N 1/4051
358/3.05
2012/0218572 A1* 8/2012 Kishino ............... H04N 1/6066
358/1.9
2012/0229820 A1* 9/2012 Koyatsu ................ G06F 3/1208
358/1.1
2013/0321873 A1* 12/2013 Ido ....................... H04N 1/6027
358/3.27
2016/0191745 A1* 6/2016 Morikawa .............. H04N 1/603
358/523
2017/0251128 A1* 8/2017 Horita .................. G06K 15/027
2017/0259581 A1* 9/2017 Pfeiffer .................. B41J 2/2132
2019/0297226 A1* 9/2019 Ohkubo ................... H04N 1/60
2020/0042841 A1* 2/2020 Morikawa ............ G06K 15/102
2020/0053251 A1* 2/2020 Yamashita ........... H04N 1/6033
2022/0027692 A1* 1/2022 Moribe .............. G06K 15/1876
2022/0286581 A1* 9/2022 Kailey ................... B41J 2/2146
2024/0364837 A1* 10/2024 Matsui ................... G06V 10/56
2025/0175570 A1* 5/2025 Yamada ............... H04N 1/6058
2025/0227191 A1* 7/2025 Yamada ............... H04N 1/6058
2026/0006149 A1* 1/2026 Watanabe .............. H04N 1/603

* cited by examiner

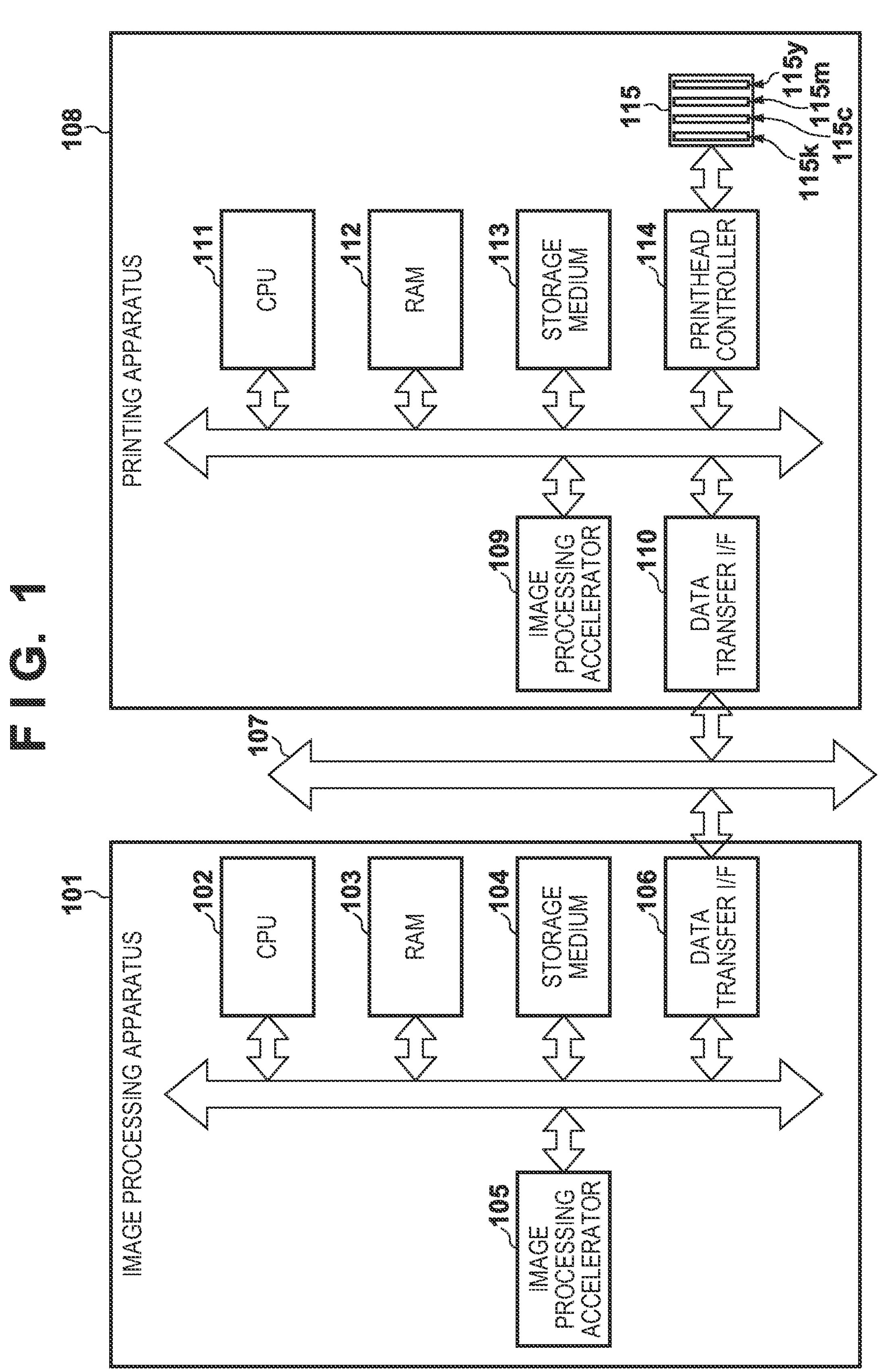
F I G. 1
108
PRINTING APPARATUS
111
CPU
112
RAM
113
STORAGE MEDIUM
114
PRINTHEAD CONTROLLER
115
115y
115m
115c
115k
109
IMAGE PROCESSING ACCELERATOR
110
DATA TRANSFER I/F
107
101
IMAGE PROCESSING APPARATUS
102
CPU
103
RAM
104
STORAGE MEDIUM
106
DATA TRANSFER I/F
105
IMAGE PROCESSING ACCELERATOR F I G. 2
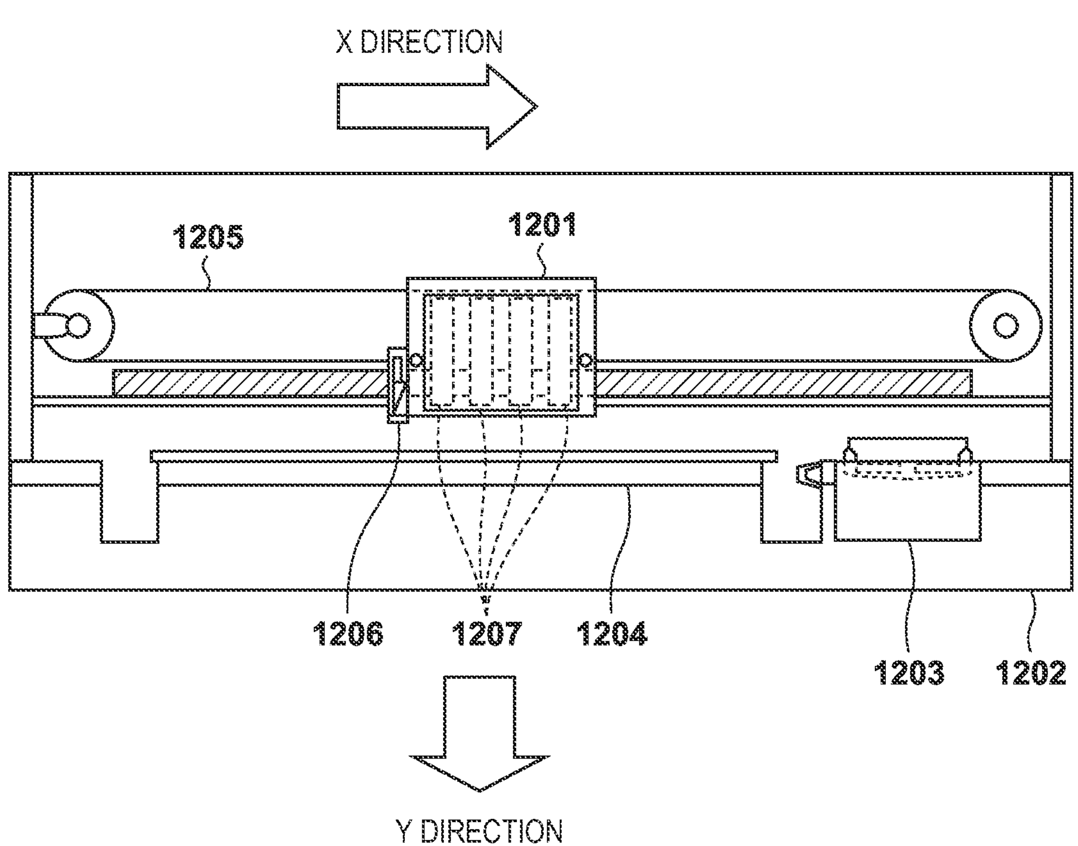

FIG. 4

1301
1302
1303
1304
1305
3D LUT
3D LUT
3D LUT
3D LUT

F I G. 5
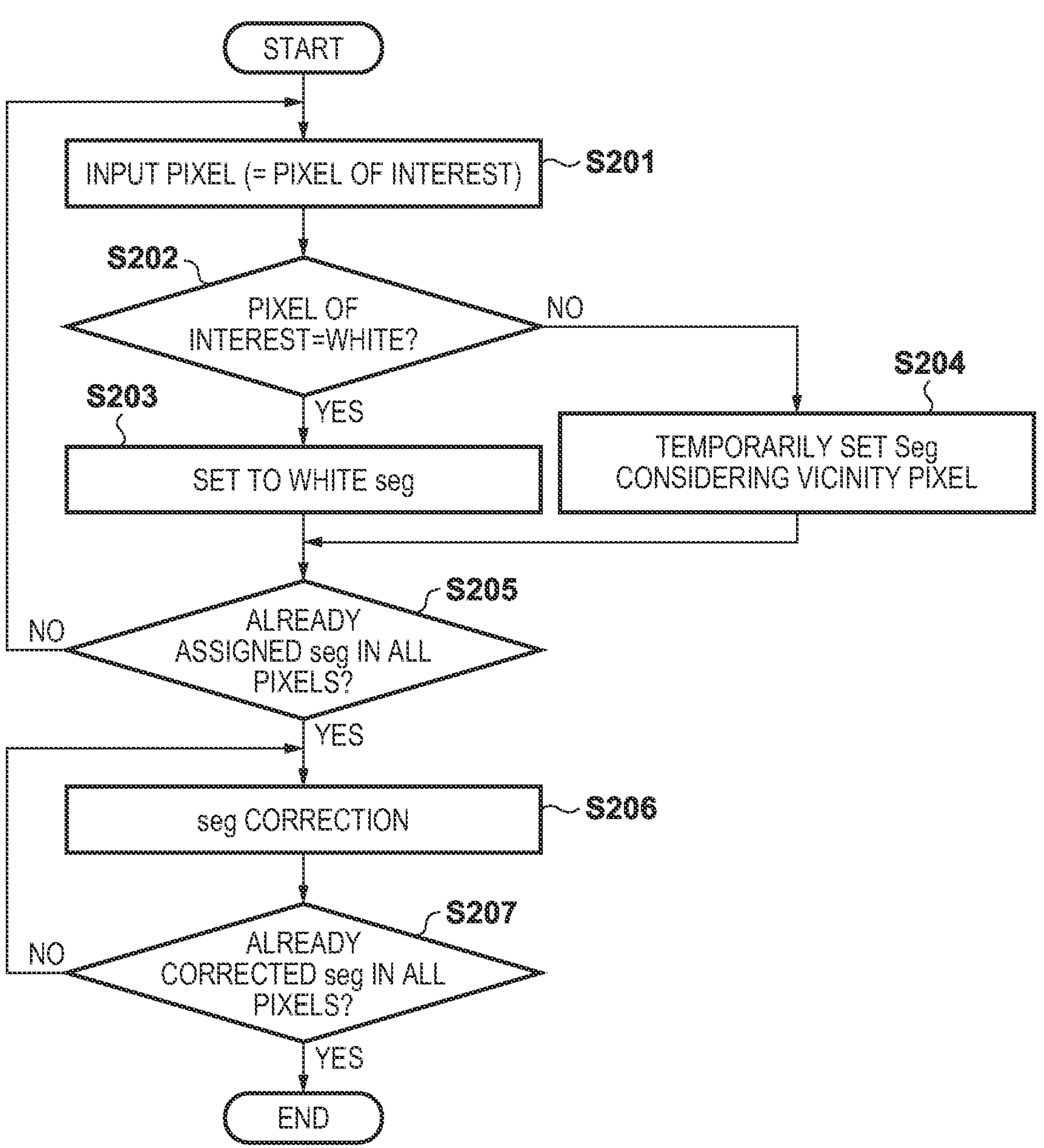

FIG. 7

| seg NUMBER | NUMBER OF pix | pri NUMBER |
|---|---|---|
| 0 | 60 | — |
| 1 | 50 | 5 |
| 2 | 60 | 4 |
| 3 | 70 | 3 |
| 4 | 80 | 2 |
| 5 | 30 | 6 |
| 6 | 20 | 7 |
| 7 | 100 | 1 |
| 8 | 10 | 8 |

F I G. 8
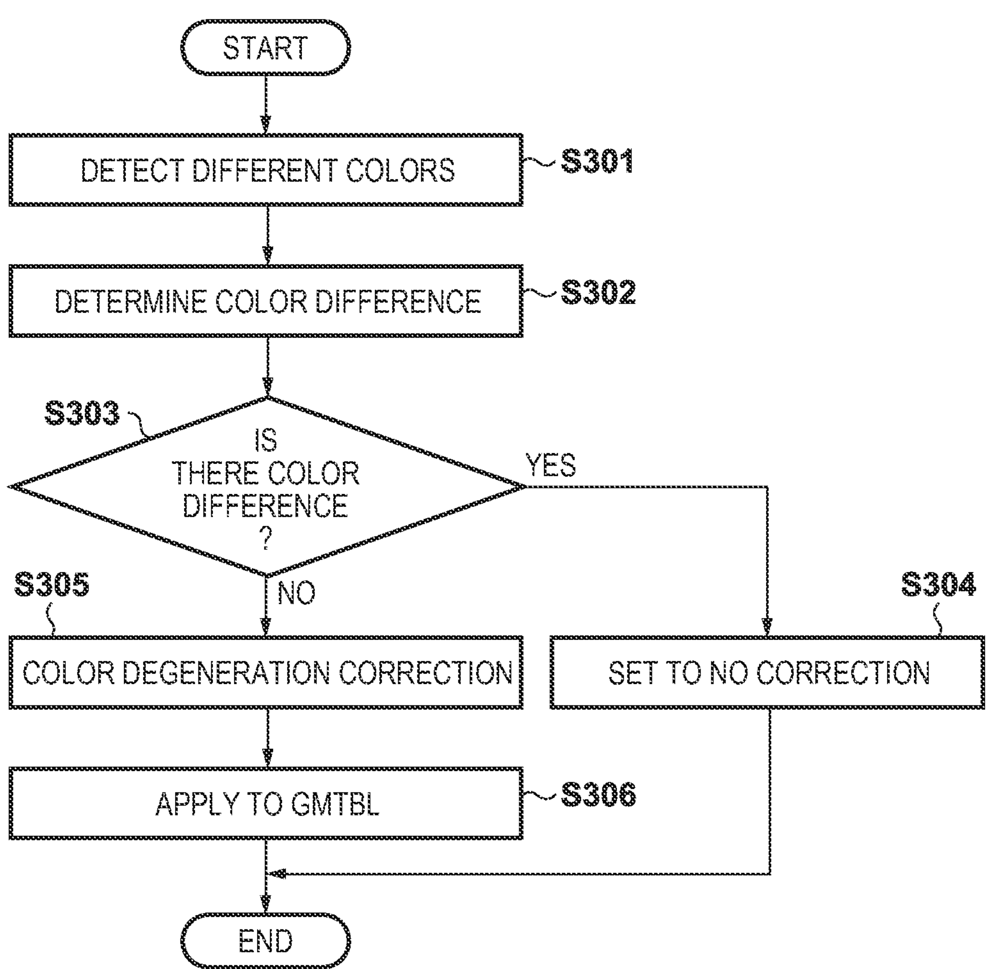

FIG. 10

COLOR CORRECTION

DRIVER CORRECTION

ICM

NONE

ADAPTIVE GAMUT MAPPING

ON

OFF

1301
1302
1303
1304
1305
3D LUT
1
2
3
4
5
1st
h1Top~h3Bot
2nd
h5Top~h5Bot 1301
1302
1303
3D LUT
3D LUT
1
2
3
4
5
SCAN1 IS EXECUTABLE
SCAN2 IS EXECUTABLE
SCAN3 IS EXECUTABLE
SCAN4 IS EXECUTABLE

IMAGE PROCESSING APPARATUS AND CONTROL METHOD THEREOF

BACKGROUND

Field

The present disclosure relates to color conversion processing.

Description of the Related Art

There is known an image processing apparatus that receives a digital original described in a predetermined color space, performs, for each color in the color space, mapping to a color gamut that can be reproduced by a printer, and outputs the original. Japanese Patent Laid-Open No. 2020-27948 (patent literature 1) describes "perceptual" mapping and "absolute colorimetric" mapping. In addition, Japanese Patent Laid-Open No. 07-203234 (patent literature 2) describes deciding the presence/absence of color space compression and the compression direction for an input color image signal.

If "perceptual" mapping described in patent literature 1 is performed, chroma may lower even for a color that can be reproduced by the printer in the color space of the digital original. If "absolute colorimetric" mapping is performed, color degeneration that the distance between colors after mapping become smaller than the distance between colors before mapping may occur in a plurality of color spaces outside the reproduction color gamut of the printer. Also, in patent literature 2, there are concerns that appropriate color degeneration is not performed because unique compression is performed in the chroma direction.

SUMMARY

According to some embodiments, an image processing apparatus can include an image obtaining unit configured to obtain image data; a conversion information obtaining unit configured to obtain first color conversion information applicable to the image data; a division unit configured to divide the image data into a plurality of region data; a correction unit configured to correct the first color conversion information to generate second color conversion information; and a processing unit configured to apply, to each of the plurality of region data, color conversion processing based on one of the first color conversion information and the second color conversion information, wherein for each of the plurality of region data, if a color difference between a third color and a fourth color obtained by converting a first color and a second color included in the region data based on the first color conversion information is smaller than a predetermined color difference, the correction unit generates the second color conversion information such that a color difference between a fifth color and a sixth color obtained by converting the first color and the second color based on the second color conversion information becomes larger than the predetermined color difference, and the processing unit applies color conversion processing based on the second color conversion information corresponding to each region data to at least one region data among the plurality of region data, for which the second color conversion information is generated.

The present disclosure enables more efficient color conversion processing.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 1 is a view showing the overall configuration of an image processing system.

FIG. 2 is a view for explaining a print operation by a printhead.

FIG. 4 is a view schematically showing an image processing pipeline (first embodiment).

FIG. 5 is a flowchart showing detailed processing of region setting.

FIG. 7 is a view showing an example of a table for priority setting.

FIG. 8 is a flowchart showing detailed processing of color degeneration correction table creation.

FIG. 10 is a view showing an example of a user input UI.

FIG. 12 is a view schematically showing color degeneration correction (second embodiment).

FIG. 15 is a view schematically showing an image processing pipeline (third embodiment).

DESCRIPTION OF THE EMBODIMENTS

Figure 3:
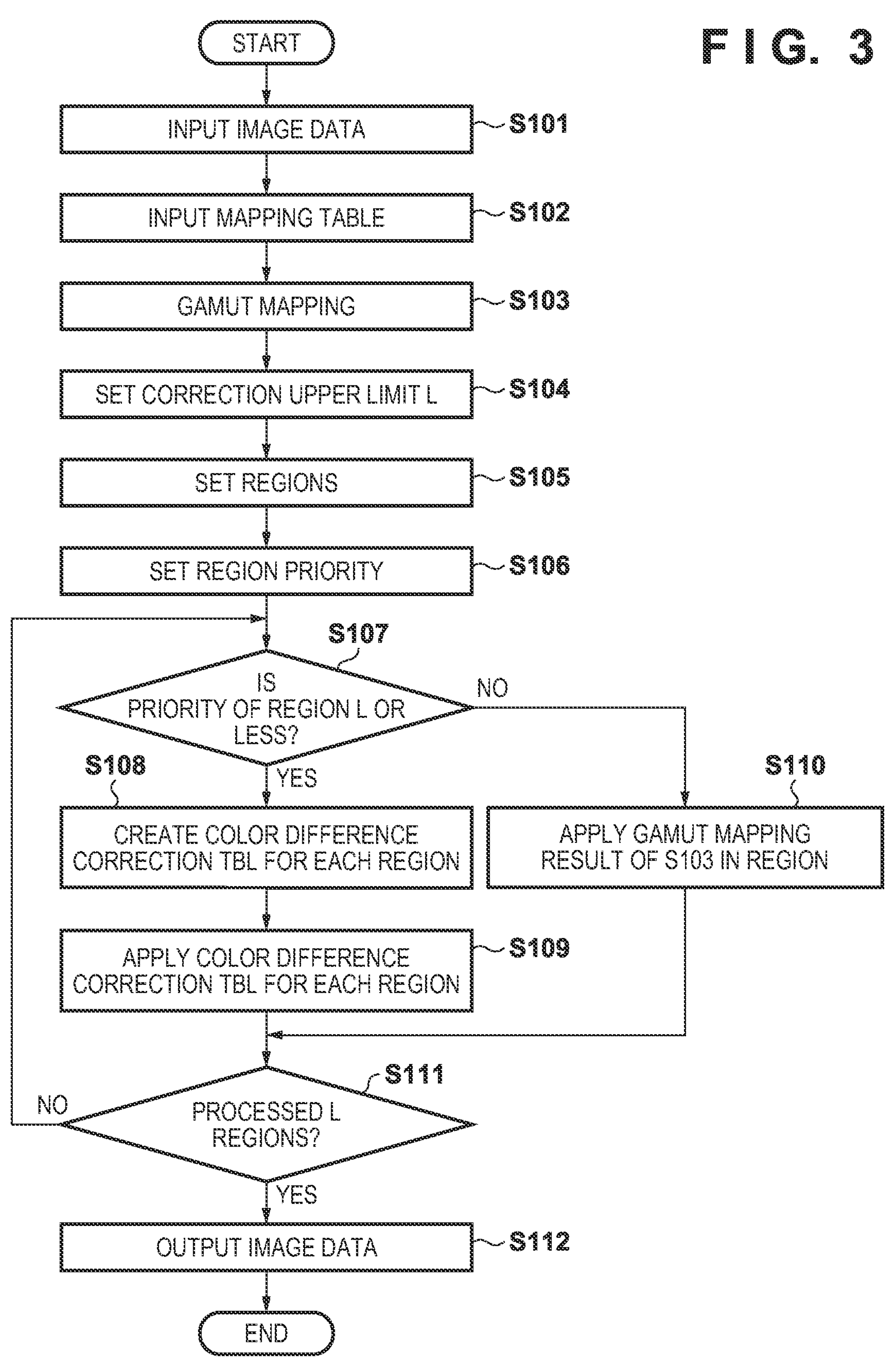
FIG. 3 is a flowchart showing processing of an image processing apparatus.

Hereinafter, embodiments will be described in detail with reference to the attached drawings. Note, the following embodiments are not intended to limit the scope of the present disclosure. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As an image processing apparatus according to the first embodiment of the present disclosure, an image processing apparatus 101 that generates image data to be provided to an inkjet printing apparatus 108 will be described below as an example.

Definition of Terms

First, terms used in this specification are defined in advance, as follows.

"Color Reproduction Region": "Color reproduction region" indicates the range of colors that can be reproduced in an arbitrary color space. "Color reproduction region" is also called a color reproduction range, a color gamut, or a gamut. A gamut volume is an index representing the extent of this color reproduction range. The gamut volume is a three-dimensional volume in an arbitrary color space. Chromaticity points forming the color reproduction range are sometimes discrete. For example, a specific color reproduction range is represented by 729 points on CIE-L*a*b*, and points between them are obtained by using a well-known interpolating operation such as tetrahedral interpolation or cubic interpolation. In this case, as the corresponding gamut volume, it is possible to use a volume obtained by calculating the volumes on CIE-L*a*b* of tetrahedrons or cubes forming the color reproduction range and accumulating the calculated volumes, in accordance with the interpolating operation method. The color reproduction region and the color gamut in this specification are not limited to a specific color space. In this specification, however, a color reproduction region in the CIE-L*a*b* space will be explained as an example. Similarly, the numerical value of a color reproduction region in this specification indicates a volume obtained by accumulation in the CIE-L*a*b* space on the premise of tetrahedral interpolation.

"Gamut Mapping": Gamut mapping is conversion processing of associating different color gamuts. For example, gamut mapping is mapping of an input color gamut to an output color gamut. Conversion in the same color gamut is not called gamut mapping. As the gamut mapping, Perceptual/Saturation/Colorimetric, and the like of the International Color Consortium (ICC) profile are generally used. In the mapping processing, conversion may be performed using a three-dimensional look up table (3DLUT). Furthermore, the mapping processing may be performed after conversion of a color space into a standard color space. For example, if an input color space is sRGB, conversion into the CIE-L*a*b* color space is performed and then the mapping processing to an output color gamut is performed on the CIE-L*a*b* color space. The mapping processing may be 3DLUT processing, or may be performed using a conversion formula. Conversion between the input color space and the output color space may be performed simultaneously. For example, the input color space may be the sRGB color space, and conversion into RGB values or CMYK values unique to a printing apparatus may be performed at the time of output.

"Original Data": Original data indicates whole input digital data as a processing target. The original data includes one to a plurality of pages. Each single page may be held as image data or may be represented as a drawing command. If a page is represented as a drawing command, the page may be rendered and converted into image data, and then processing may be performed. The image data is data formed by a plurality of pixels that are two-dimensionally arranged. Each pixel holds information indicating a color in a color space. Examples of the information indicating a color are, for example, RGB values, CMYK values, a K value, CIE-L*a*b* values, HSV values, and HLS values. Note that this embodiment is applicable to one page or a plurality of pages. Hence, the following explanation will be made concerning image data of one page.

"Color Degeneration": The fact that when performing gamut mapping for arbitrary two colors, the distance between the colors after mapping in a predetermined color space is smaller than the distance between the colors before mapping is defined as color degeneration. More specifically, assume that there are a color A and a color B in a digital original, and mapping to the color gamut of a printer is performed to convert the color A into a color C and the color B into a color D. In this case, the fact that the distance between the colors C and D is smaller than the distance between the colors A and B is defined as color degeneration. If color degeneration occurs, colors that are recognized as different colors in the digital original are sometimes recognized as identical colors when the original is printed. For example, if color degeneration occurs when printing a graph in which different items are expressed as different colors, the items that are originally different items may erroneously be recognized as identical items because the different colors change to identical colors. The predetermined color space in which the distance between the colors is calculated may be an arbitrary color space. Examples of the color space are the sRGB color space, the Adobe RGB color space, the CIE-L*a*b* color space, the CIE-LUV color space, the XYZ color space, the xyY color space, the HSV color space, and the HLS color space.

System and Apparatus Configuration

FIG. 1 is a view showing the overall configuration of an image processing system. The image processing system includes an image processing apparatus 101 and a printing apparatus 108 which are connected via a communication line 107 to be able to communicate with each other, and can include other components. In the following explanation, the printing apparatus 108 is assumed to be a color inkjet printing apparatus but may be a printing apparatus of another type (for example, an electrophotographic printing apparatus).

As the image processing apparatus 101, a personal computer (PC), a tablet, or a server is used. The image processing apparatus 101 includes a central processing unit (CPU) 102, a random access memory (RAM) 103, a storage medium 104, an image processing accelerator 105, and a data transfer interface (I/F) 106.

The CPU 102, which can include one or more processors, circuitry, or combinations thereof, executes various kinds of image processes by reading out programs stored in the storage medium 104 such as an hard disk drive (HDD) or read only memory (ROM) to the RAM 103 as a work area and executing the readout programs. For example, the CPU 102 obtains a command from the user via a Human Interface Device (HID) I/F (not shown). Then, the CPU 102 executes various kinds of image processes in accordance with the obtained command and the programs stored in the storage medium 104. Furthermore, the CPU 102 performs predetermined processing for image data obtained via a data transfer I/F 106 in accordance with the program stored in the storage medium 104. The CPU 102 displays the result and various kinds of information on a display (not shown), and transmits them via the data transfer I/F 106.

The image processing accelerator 105 is hardware capable of executing image processing faster than the CPU 102. The image processing accelerator 105 is activated when the CPU 102 writes a parameter and data for image processing at a predetermined address of the RAM 103. The image processing accelerator 105 loads the above-described parameter and data, and then executes the image processing for the data. Note that the image processing accelerator 105 is not an essential element, and the CPU 102 may execute equivalent processing (that is, implements the processing by software). More specifically, the image processing accelerator is a graphics processing unit (GPU) or an exclusively designed electric circuit (ASIC). The above-described parameter can be stored in the storage medium 104 or can be externally obtained via the data transfer I/F 106.

The printing apparatus 108 includes an image processing accelerator 109, a data transfer I/F 110, a CPU 111, a RAM 112, a storage medium 113, a printhead controller 114, a printhead 115, and can include other components.

The CPU 111 reads out a program stored in the storage medium 113 to the RAM 112 as a work area and executes the readout program, thereby comprehensively controlling the printing apparatus 108. The image processing accelerator 109 is hardware capable of executing image processing faster than the CPU 111. The image processing accelerator 109 is activated when the CPU 111 writes a parameter and data for image processing at a predetermined address of the RAM 112.

The image processing accelerator 109 loads the above-described parameter and data, and then executes the image processing for the data. Note that the image processing accelerator 109 is not an essential element, and the CPU 111 may execute equivalent processing. The above-described parameter can be stored in the storage medium 113, or can be stored in a storage (not shown) such as a flash memory or an HDD.

The image processing to be performed by the CPU 111 or the image processing accelerator 109 will now be explained. This image processing is, for example, processing of generating, based on obtained print data, data indicating the dot formation position of ink in each scan by the printhead 115. The CPU 111 or the image processing accelerator 109 performs color conversion processing and quantization processing for the obtained print data.

The color conversion processing is processing of generating color separation data corresponding to a plurality of inks handled by the printing apparatus 108. For example, the obtained print data contains image data indicating an image. In a case where the image data is data indicating an image in a color space coordinate system such as sRGB as the expression colors of a monitor, data indicating an image by color coordinates (R, G, B) of the sRGB is converted into ink data (CMYK) to be handled by the printing apparatus 108. The color conversion method is implemented by matrix operation processing or processing using a three-dimensional lookup table (LUT) or a four-dimensional LUT.

The printing apparatus 108 according to this embodiment uses inks of black (K), cyan (C), magenta (M), and yellow (Y) as an example. Therefore, image data of RGB signals is converted into image data formed by 8-bit color signals of K, C, M, and Y. The color signal of each color corresponds to the application/discharge amount of each ink. As for the number of ink colors, a four-color configuration including K, C, M, and Y has been described as an example. However, to improve image quality, it is also possible to additionally use other ink colors such as light cyan (Lc), light magenta (Lm), and gray (Gy) having low concentrations. In this case, ink signals corresponding to the inks are generated.

After the color conversion processing, quantization processing is performed for the ink data. This quantization processing is processing of decreasing the number of tone levels of the ink data. In this embodiment, quantization is performed by using a dither matrix in which thresholds to be compared with the values of the ink data are arrayed in individual pixels. After the quantization processing, binary data indicating whether to form a dot in each dot formation position is finally generated.

After the above-described image processes (color conversion and quantization) are performed, the printhead controller 114 transfers the binary data to the printhead 115. At the same time, the CPU 111 performs printing control via the printhead controller 114 so as to operate a carriage motor for operating the printhead 115, and to operate a conveyance motor for conveying a print medium. The printhead 115 scans the print medium (paper or the like) and also discharges ink droplets, thereby forming an image on the print medium.

The image processing apparatus 101 and the printing apparatus 108 are connected to each other via the communication line 107. In this embodiment, a Local Area Network (LAN) is assumed as an example of the communication line 107. However, the connection may also be obtained by using, for example, a universal serial bus (USB) hub, a wireless communication network using a wireless access point, or a Wifi direct communication function. Also, the image processing apparatus 101 may be implemented in the printing apparatus 108 (that is, configured integrally), or may be implemented on a user terminal (a PC or a smartphone) or a cloud server.

Printhead Mechanism of Printing Apparatus

The operation of the printhead 115 in image formation by the printing apparatus 108 will be described. A description will be provided below by assuming that the printhead 115 has four print nozzle arrays corresponding to four color inks of cyan (C), magenta (M), yellow (Y), and black (K).

FIG. 2 is a view for explaining a print operation by the printhead 115. More specifically, FIG. 2 is a side sectional view for explaining the configuration of the printing unit of the inkjet printing apparatus. A carriage 1201 on which a printhead 1207 (including the four print nozzle arrays corresponding to the four colors) and an optical sensor 1206 are mounted can reciprocally move along the X direction shown in FIG. 2 by the driving force of a carriage motor transmitted via a belt 1205. While the carriage 1201 moves in the X direction relative to paper, the printhead 1207 discharges the inks in the Z direction (the depth direction in FIG. 2) based on print data, thereby printing an image of one scan on the paper arranged on a platen. If one print scan ends, the paper is conveyed in the Y direction (conveyance direction) crossing the X direction in FIG. 2 by a distance corresponding to the print width of one scan. Such a plurality of print scans and conveyance operations are alternately repeated, thereby gradually forming an image on the paper.

The optical sensor 1206 performs a detection operation while moving together with the carriage 1201, thereby determining whether paper exists on a platen 1204. At a position off the platen 1204 in the scan region of the carriage 1201, a recovery mechanism 1203 configured to perform maintenance processing of the printhead is arranged.

If the operation of the carriage 1201 unexpectedly stops during ink discharge by the printhead 1207, print unevenness occurs due to the landing time difference of inks discharged to the paper, and the print unevenness leads to user's dissatisfaction. The operation of the carriage 1201 stops because for example, data corresponding to the ink discharge of the printhead 1207 scanning in the X direction is not stored in a print buffer. It is considered that data shortage in the print buffer occurs because the speed of image processing of image data by the image processing apparatus 101 is lower than a required speed of the printhead. The required speed is a requirement value to prevent the printhead from unnecessarily stopping. The required speed of the printhead can approximately be calculated based on the moving speed and the moving distance of the carriage 1201 (the distance increases by a value corresponding to the count of reciprocal movement in the X direction). Quality that the user can set on a user interface (UI) of a printer application can decide the operation of the printhead 1207 such as the moving speed and the moving distance.

Outline

In color degeneration correction, the larger the number of colors included in image data is, the more largely the tint is changed to increase the distance between colors. If a tint changes, this may cause the user to recall a failure of an apparatus such as an ink discharge failure. In this embodiment, image data is divided into a plurality of regions, and color degeneration correction is executed for each region. Region division is set based on the arrangement or feature of content included in the image data. Since the number of color combinations in one region is generally small in the whole image data, the change of the tint can be educed in color degeneration correction.

However, in the configuration that executes color degeneration correction for each region, there are concerns that if the image processing speed decreases, the printhead stops, and image quality degrades due to print unevenness. More specifically, if the number of types of mapping tables for color degeneration correction increase, the number of times of deploying, in a cache memory, table information held in the main memory increases, resulting in an increase of the processing time. The number of times of deployment can be decreased by scanning a whole image data region using a table deployed once on the cache memory and executing mapping for each pixel corresponding to the application destination of the deployed table. However, the whole image data region should be scanned a plurality of times, resulting in an increase of the processing time. Hence, a correction upper limit count that satisfies the required processing speed is determined, and regions to execute color degeneration correction in the image data are limited in accordance with the correction upper limit count. Thus, unevenness suppression can be implemented by preventing the printhead from stopping, and mapping can be performed in which the degree of color degeneration is decreased in a region that has undergone color degeneration correction.

Operation of Apparatus

FIG. 3 is a flowchart showing processing of the image processing apparatus. With respect to a combination of colors subjected to color degeneration, the distance between the colors in a predetermined color space can be increased by the processing shown in FIG. 3. As a result, it is possible to reduce the degree of color degeneration. The processing shown in FIG. 3 is implemented when, for example, the CPU 102 reads out a program stored in the storage medium 104 to the RAM 103 and executes the readout program. The processing shown in FIG. 3 may be executed by the image processing accelerator 105. The CPU 102 and the image processing accelerator 105 may each include one or more processors, circuitry, or combinations thereof.

In step S101, the CPU 102 inputs image data (obtains an image) stored in the storage medium 104. Alternatively, the CPU 102 may input image data obtained via the data transfer I/F 106. The CPU 102 performs color information obtaining of obtaining image data including color information from the input original data. The image data includes values representing a color expressed in a predetermined color space. In the color information obtaining, the values representing a color are obtained. The values representing a color are, for example, sRGB data, Adobe RGB data, CIE-L*a*b* data, CIE-LUV data, XYZ color system data, xyY color system data, HSV data, or HLS data.

In step S102, the CPU 102 obtains a gamut mapping table (first color conversion information) recorded in advance in the storage medium 104 (conversion information obtaining).

In step S103, the CPU 102 performs gamut mapping for the color information of each pixel of the image data using the obtained gamut mapping table. The image data after gamut mapping is recorded in the RAM 103 or the storage medium 104. More specifically, the gamut mapping table is a three-dimensional lookup table. By the three-dimensional lookup table, a combination of output pixel values (Rout, Gout, Bout) can be calculated with respect to a combination of input pixel values (Rin, Gin, Bin). If each of the input values Rin, Gin, and Bin has 256 tones, a table Table1[256][256][256][3] having 256×256×256=16,777,216 sets of output values in total is preferably used. The CPU 102 performs color conversion using the above-described gamut mapping table. More specifically, color conversion can be implemented by performing, for each pixel of the image formed by the RGB pixel values of the image data input in step S101, processing given by $$Rout = Table1[Rin][Gin][Bin][0] \tag{1}$$

$$Gout = Table1[Rin][Gin][Bin][1] \tag{2}$$

$$Bout = Table1[Rin][Gin][Bin][2] \tag{3}$$

Note that a known contrivance to reduce the table size, such as decreasing the number of grids of the lookup table from 256 to, for example, 16 and interpolating table values of a plurality of grids to decide output values, may be used.

In step S104, the CPU 102 obtains a correction upper limit count L executable by image processing (upper limit obtaining). The correction upper limit count L may be accepted from the outside (for example, the user), but an example in which the CPU 102 calculates it (for example, by executing printer driver software) will be described here. First, the CPU 102 sets a required speed for the image processing apparatus. The required speed is a requirement value to prevent the printhead 1207 from unnecessarily stopping. As described above, if the printhead stops, a landing time difference is generated, resulting in unevenness. In this embodiment, as an example, the required speed is approximately calculated by $$\text{required speed [pixel/sec]} = N \times CR \div P \tag{4}$$

The required speed can be obtained based on operation conditions including a value (N) obtained by converting the head length of the printhead into the data processing resolution of the printer, the head scan speed (CR) of the printhead, and the count (P) of printhead scan on the same region of paper. The head length means the length of a print nozzle array (the print width of one scan in the Y direction). The longer the head length is, and the higher the operation speed (image formation speed) until completion of printing in a region of one scan is, the higher the required speed is. For example, if printhead scan occurs a plurality of times in the same region of paper, the required speed is lower than that in one scan. Note that a more correct required pixel transfer rate can be calculated considering that, for example, the head scan speed decreases as the printhead approaches a paper end, or the printhead moves up to the recovery mechanism beyond the paper end. The required speed calculation method is not limited to this. Such calculation processing may be executed, or a fixed value may be set. The information of the required speed may be held in the storage medium 104, or may be obtained from the storage medium 113 of the printing apparatus 108.

Figure 4:
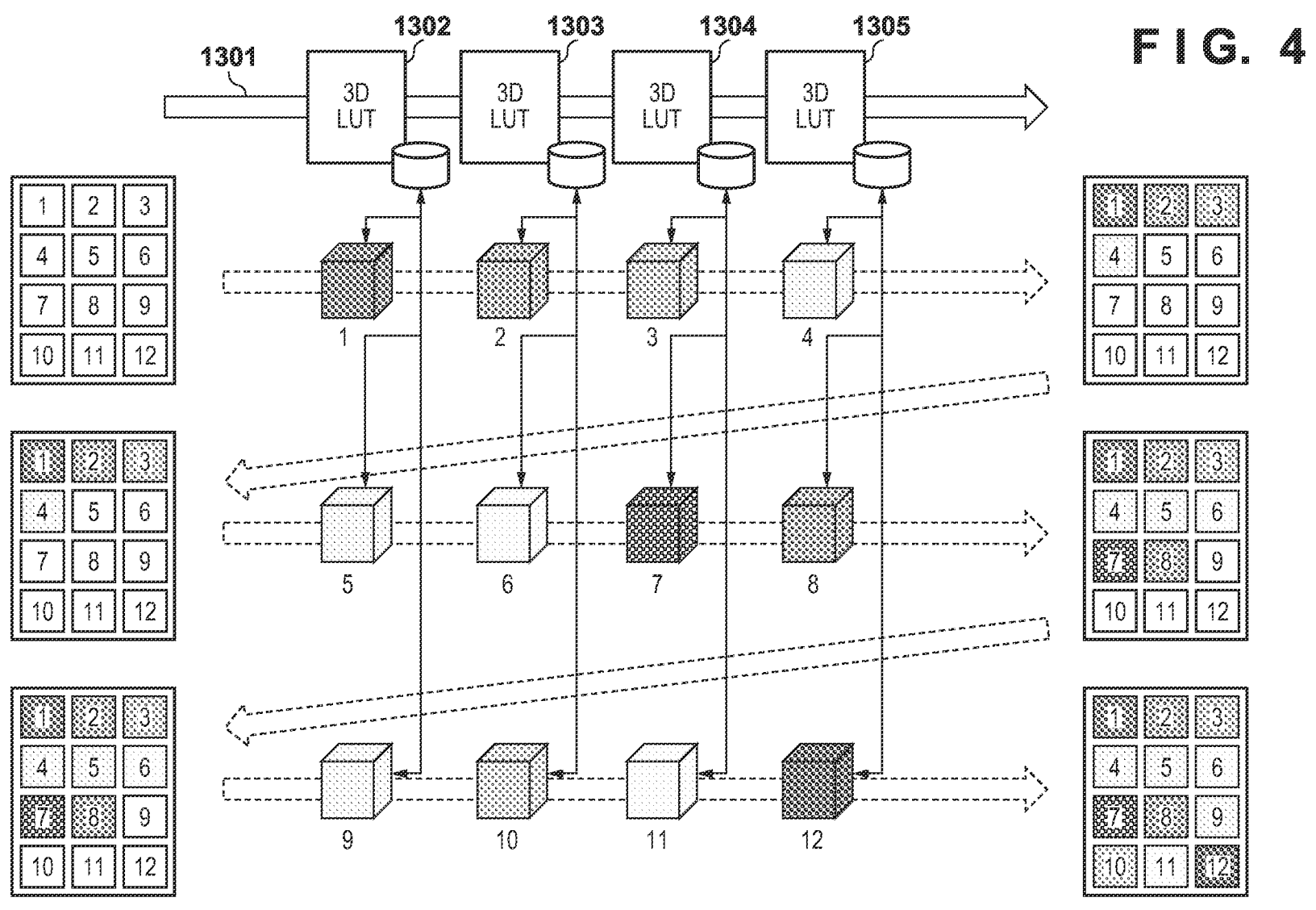

Next, the CPU 102 derives the upper limit count of correction that can be performed for the required speed. FIG. 4 is a view schematically showing an image processing pipeline according to the first embodiment. More specifically, FIG. 4 shows an example of processing when the image processing accelerator 105 individually executes gamut mapping for each region. In FIG. 4, a dedicated circuit for applying a color degeneration correction table is provided in the image processing accelerator 105.

An image processing pipeline 1301 extends through the image processing accelerator 105. The two ends of the image processing pipeline 1301 are connected to an internal memory. Read from the internal memory is performed at the start of processing in the pipeline, and write to the internal memory is performed at the end of processing in the pipeline. As processes in the pipeline, 3DLUT circuits 1302 to 1305 are provided. These are arranged on the pipeline and connected. As an advantage of constituting pipeline processing, internal arithmetic processes can be executed as parallel processes. More specifically, in the image processing pipeline 1301, each pixel of image data of a processing target is transmitted through the pipeline. Each of the 3DLUTs 1302 to 1305 processes only a pixel input to itself one after another and transfers the pixel to the next circuit. For example, when the 3DLUT 1305 processes a PIXith pixel, the 3DLUT 1304 processes a (PIXi+1)th pixel, the 3DLUT 1303 processes a (PIXi+2)th pixel, and the 3DLUT 1302 processes a (PIXi+3)th pixel. In the next sequence, the 3DLUT 1305 processes a (PIXi+1)th pixel, the 3DLUT 1304 processes a (PIXi+2)th pixel, the 3DLUT 1303 processes a (PIXi+3)th pixel, and the 3DLUT 1302 processes a (PIXi+4)th pixel. Each 3DLUT owns a dedicated SRAM, and holds a color degeneration correction table to be processed by the circuit itself.

In the example shown in FIG. 4, when 12 regions exist in a page, different individual color degeneration correction tables are applied to the regions. Since the image processing pipeline 1301 includes four dedicated correction circuits, color degeneration correction tables corresponding to four regions can be applied in one pipeline processing. When one pipeline processing is ended, each dedicated correction circuit replaces the color degeneration correction table held in the SRAM of its own with a color degeneration correction table for a different region, which is held in the storage medium 104. In the example shown in FIG. 4, to correct 12 regions, pipeline processing needs to be executed three times.

The executable speed of the image processing accelerator 105 is controlled to the lowest processing speed in the image processing pipeline 1301 and the 3DLUTs 1302 to 1305. As described above, pipeline processing is basically performed as parallel processes, and the circuits execute processes for different pixels in the same time. For example, in a case where the 3DLUT 1304 takes a processing time twice longer than the others, unless the result of the 3DLUT 1304 is output, the 3DLUT 1305 cannot start processing the (PIXi+1)th pixel even if processing of the PIXith pixel is ended. Since the 3DLUT 1304 cannot receive the (PIXi+1)th pixel, the 3DLUT 1303 cannot start processing the (PIXi+3)th pixel even if processing of the (PIXi+2)th pixel is ended. Note that although the delay of processing can temporarily be eliminated by, for example, holding processed pixels in the individual SRAMs, the processing speed is still controlled to the circuit of the low processing speed.

If the processing count of the pipeline is defined as S (in FIG. 4, S=3), the executable processing speed is approximately calculated by $$\text{processing speed [pixel/sec]} = (\text{Min}(PL, LUT) - T) \div S \tag{5}$$

In equation (5), T is an overhead time needed to replace the color degeneration correction table held in the SRAM between the main memory and the cache memory. Here, a configuration in which an SRAM capable of holding one color degeneration correction table is attached to one correction circuit is shown. PL is a pixel rate to transfer a pixel to a color degeneration correction table by the image processing pipeline 1301. On the other hand, LUT is the processing speed of the correction circuit for a pixel. If two or more correction circuits exist, the lowest processing speed in the correction circuits is given to the LUT variable set in Min calculation of equation (5). The correction upper limit count L is obtained by $$\text{correction upper limit count } L = C \times S \tag{6}$$

In equation (6), C is the number of correction circuits that can be executed in parallel on the image processing pipeline 1301. In the example shown in FIG. 4, C is “4”, that is the number of 3DLUT 1302 to 1305.

The correction upper limit count L can be calculated in the above-described way but needs to be set such that the calculation result satisfies the required speed. Hence, S is adjusted such that the processing speed (the speed of color degeneration correction table generation processing) is the required speed or more. For example, in the example shown in FIG. 4, correction is performed for 12 regions. If the required speed cannot be satisfied unless S=2, the number of correctable regions is up to 4×2=8.

In the above explanation, the upper limit L is derived by calculating the required speed and the processing speed. However, the upper limit L may be set as a fixed value. Also, since each formula is appropriate calculation, other overhead times of the circuits are not taken into consideration. For this reason, gamut mapping processing in step S103 may also be taken into consideration in calculating the processing speed. Also, appropriately adjustable coefficients α, β, and the like may be added to the calculation of the processing speed.

In this embodiment, the processing speed is calculated by pipeline processing with dedicated correction circuits. However, the present disclosure is not limited to this. For example, if the image processing accelerator 105 is processed by the CPU, a unit capable of parallelly activating a program memory can be a parallel processing unit. Under the conditions of the CPU, each color degeneration correction table is held in a cache memory for program execution. If replacement beyond the upper limit of the cache memory occurs, the color degeneration correction table needs to be obtained from the main memory, and the replacement time greatly affects the processing speed. The same applies to a GPU. Although the speed needed for image processing is high in the GPU, since the memory size that a single Core can hold is small, the action of reading out pixel information from the main memory is a bottleneck for the processing speed. It is preferable to decide the processing speed requirement in accordance with the assumed system and set the correction upper limit count L. The units described throughout the present disclosure are exemplary and/or preferable modules or other components for implementing the processes described in the present disclosure. The modules can be hardware units (such as a field programmable gate array, a digital signal processor, an application specific integrated circuit or the like) and/or software modules (such as a computer readable program).

In step S105, the CPU 102 sets regions in the input image data. Various methods can be considered as the region setting method. As an example, a setting method using a white pixel value of the input image as a determination criterion is used.

FIG. 5 is a flowchart showing detailed processing of region setting. FIG. 5 shows a region setting method using a white pixel value as a determination criterion. Information seg indicates each set region (segment), and each region is managed by information of a seg number of 0, 1, 2 . . . .

In step S201, the CPU 102 obtains one pixel in the image data. In the flowchart, this pixel is handled as a pixel of interest.

Figure 6A:
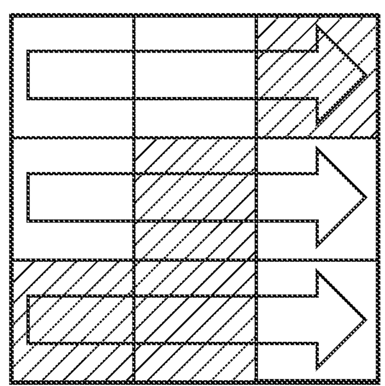
FIGS. 6A to 6C are views for explaining an example of region setting processing.
Figure 6B:
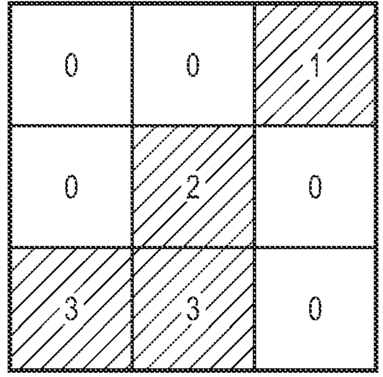
Figure 6C:
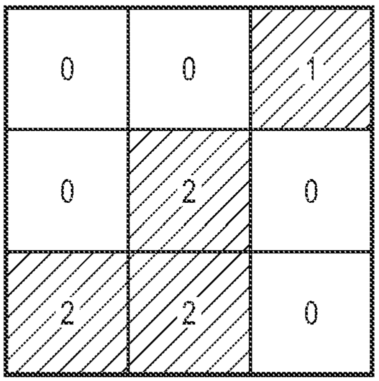

FIGS. 6A to 6C are views for explaining an example of region setting processing. In FIG. 6A, rectangular information indicates image data. In the image data, a black pixel is a "non-white" region and a white pixel is a "white" region. By scanning the image data in a direction indicated by an arrow, the pixel of interest is changed. With respect to the image data shown in FIG. 6A, the top pixel row is scanned from left to right. Next, the middle pixel row is scanned from left to right, and the bottom pixel row is finally scanned from left to right.

In step S202, the CPU 102 determines whether the pixel of interest is a white pixel. The white pixel is, for example, a pixel with R=G=B=255 in 8-bit information. In this processing, whether the pixel of interest is a white pixel may be determined after performing the gamut mapping in step S103 or may be determined for a pixel value before performing gamut mapping. If the determination processing is performed for the pixel after performing the gamut mapping, a table setting restriction for guaranteeing that the pixel with R=G=B=255 holds the values even after the gamut mapping (the pixel remains the white pixel) may occur. If it is determined that the pixel of interest is a white pixel, the process advances to step S203; otherwise, the process advances to step S204.

In step S203, the CPU 102 sets white seg in the pixel of interest. In this embodiment, seg is organized by a numerical value and white seg=seg number of 0 is set.

In step S204, the CPU 102 temporarily sets seg in the pixel of interest. Inspection is performed in the scan direction of the pixels shown in FIG. 6A, and seg is temporarily set based on seg of the adjacent pixel on the left side of the pixel of interest. In this embodiment, as an example, temporary setting is done based on the following rules.

When the adjacent pixel on the left side has a seg number=0, a new seg number is assigned to the pixel of interest.

When the adjacent pixel on the left side has a seg number=N, the seg number=N is assigned to the pixel of interest.

In step S205, the CPU 102 determines whether the temporary seg numbers have been assigned to all the pixels of the image data. If the temporary seg numbers have been assigned, the process advances to step S206; otherwise, the process returns to step S201.

FIG. 6B shows a result of temporarily setting seg. FIG. 6B shows a state in which temporary seg numbers=0 to 3 are assigned within a 3×3 range by the above-described simple setting method.

In step S206, the CPU 102 corrects the temporarily set seg number. The pixel of interest is corrected in the same scan direction as in FIG. 6A. The CPU 102 compares the seg number of the pixel of interest with the smallest seg number, except for the seg number=0, among the seg numbers of the upper, lower, left, and right pixels, and assigns the smaller seg number as the seg number of the pixel of interest.

In step S207, the CPU 102 determines whether the seg number has been corrected for all the pixels of the image data. If the seg number has been corrected, the region setting procedure ends; otherwise, the process returns to step S206.

FIG. 6C shows the final setting result of seg. The seg number=3 existing in FIG. 6B is corrected to the seg number=2. The pixels each having the temporary seg number of 0, 1, or 2 have the same numbers.

The region setting shown in this embodiment is merely an example. A pixel other than the white pixel in the pixel information may be considered as the criterion of region setting, and determination of seg may be implemented by a different procedure. Determination may be done such that reduction processing is performed in advance, and all pixels that overlap each other in the reduction are regarded as the same seg. A method using the reduction processing is effective for shortening the processing time in region setting. Information other than R, G, and B information of the pixel may be used.

In the region setting executed in step S105 described above, two or more regions formed by the same single color (one color) may be reset as the same seg number. For example, it is determined, for each of the plurality of (M) regions obtained by temporary division, whether the pixel values in the region are formed by a single color, and regions formed by the same single color are assigned the same seg number. For a region formed by a single color, since the distance between a plurality of colors need not be taken into consideration, color degeneration correction need not be executed. For this reason, since the regions need not be divided in processing to be described later, the regions can be integrated without changing image quality. Note that "single color" is one of conditions not to execute color degeneration correction, and the present disclosure is not limited to this. For example, if color degeneration correction is not to be executed for a gray axis of R=G=B, regions that satisfy the condition can be integrated.

In step S106, the CPU 102 sets a correction priority for each region set in step S105. If the correction upper limit count L is smaller than the number of set regions, it is impossible to correct all regions. It is therefore desirable to make ranking concerning "which region should be corrected". As a simple method, the seg numbers given at the time of region setting in step S105 can directly be used as priorities. As an example of a method more effective for the user is a method of setting the priority based on the area of each region.

FIG. 7 is a view showing an example of a table for priority setting. Here, assume that regions of seg numbers 0 to 8 are set. The number of pixels (Pix count) is counted for each region, and priority (pri number) is set based on the number of pixels. Note that in this embodiment, seg number=0 is considered as white seg and excluded from pri number setting because it is not a region to execute correction. Note that there is another method of giving priority. For example, priority may be given based on the number of colors existing in each region. Alternatively, priority may be given based on the effect of color degeneration correction (the difference between a color that has undergone color degeneration correction and a color not) when the correction is executed. A priority order may be set based on the shape of each region or additional information (object type information such as "character" or "photo" additionally given to a pixel value). For such priority order setting methods, a determination condition for enabling estimating whether color degeneration correction should be executed for a region is preferably given.

If regions that satisfy the condition not to execute color degeneration correction are integrated in step S105 described above, high priority may set for the integrated region. According to the example shown in FIG. 7, priority can easily be added by calculating the pix count of the integrated region from the sum of the pix numbers of the regions before integration. It is also possible to set higher priority for the integrated region over other individual regions.

In step S107, the CPU 102 executes determination processing of determining, based on the correction priority pri of the region and the correction upper limit count L, whether color degeneration correction is necessary. The processes of steps S108 and S109 are executed as many times as the priority L if the number of regions is equal to or larger than the priority L. If the priority of the region is lower than L, the process advances to step S110.

In step S108, the CPU 102 generates a color degeneration-corrected table (second color conversion information) using the image data input in step S101, a gamut mapping table obtained in step S102, and the image data after gamut mapping performed in step S103. The color degeneration-corrected table is created for each region (that is, for each data of region of interest) divided in step S104. The format of the color degeneration-corrected table is the same as that of the gamut mapping table. Details of the process of step S108 will be described later with reference to FIG. 8.

In step S109, the CPU 102 calculates corrected region data that has undergone color degeneration correction by performing calculation for one or more corresponding region data of the image data input in step S101 using the color degeneration-corrected table created in step S108. The generated region data after color degeneration correction is recorded in the RAM 103 or the storage medium 104.

In step S110, the CPU 102 records the result of performing gamut mapping for the region data in step S103 in the RAM 103 or the storage medium 104.

In step S111, the CPU 102 determines whether all the regions of the image data have been processed. If all the regions have been processed, the process advances to step S112; otherwise, the process returns to step S107.

In step S112, the CPU 102 outputs the image data after color degeneration correction recorded in step S109 from the image processing apparatus via the data transfer I/F 106. The gamut mapping may be mapping from the sRGB color space to the color reproduction gamut of the printing apparatus. In this case, it is possible to suppress decreases in chroma and color difference caused by the gamut mapping to the color reproduction gamut of the printing apparatus.

FIG. 8 is a flowchart showing detailed processing of color degeneration correction table creation (step S108). The processing shown in FIG. 8 is implemented when, for example, the CPU 102 reads out a program stored in the storage medium 104 to the RAM 103 and executes the readout program. The processing shown in FIG. 8 may be executed by the image processing accelerator 105.

In step S301, the CPU 102 detects unique color types held by pixel data existing in each region. The detection result is recorded as a unique color list in the RAM 103 or the storage medium 104. The unique color list is initialized at the start of step S301. For example, the detection processing is repeated for each pixel of the region data, and it is determined, for all pixels included in a region, whether the color of each pixel is different from the unique colors detected until now. For example, it is determined whether the color of a target pixel is a color included in the unique color list. If it is determined that the color is not included, color information is newly added to the unique color list. This makes it possible to detect the unique color list included in the region data.

If the number of pixels in the region is large, it is expected that the processing so detecting different colors takes time, and therefore, the colors may discretely be detected. If the input image data is sRGB data, each of the input values has 256 tones, and unique colors are thus detected from 256×256×256=16,777,216 colors in total. In this case, the number of colors is enormous, thereby decreasing the processing speed. Therefore, the unique colors may be detected discretely. For example, the 256 tones may be reduced to 16 tones, and then unique colors may be detected. If the number of colors is reduced, colors may be reduced to the colors of the closest grids. In this case, it is possible to detect unique colors from 16×16×16=4,096 colors in total, thereby improving the processing speed.

In step S302, based on the unique color list detected in step S301, the CPU 102 detects the number of combinations of colors subjected to color degeneration, among the combinations of the colors existing in the region. Here, whether color degeneration has occurred is determined based on a color difference, as will be described below.

Figure 9:
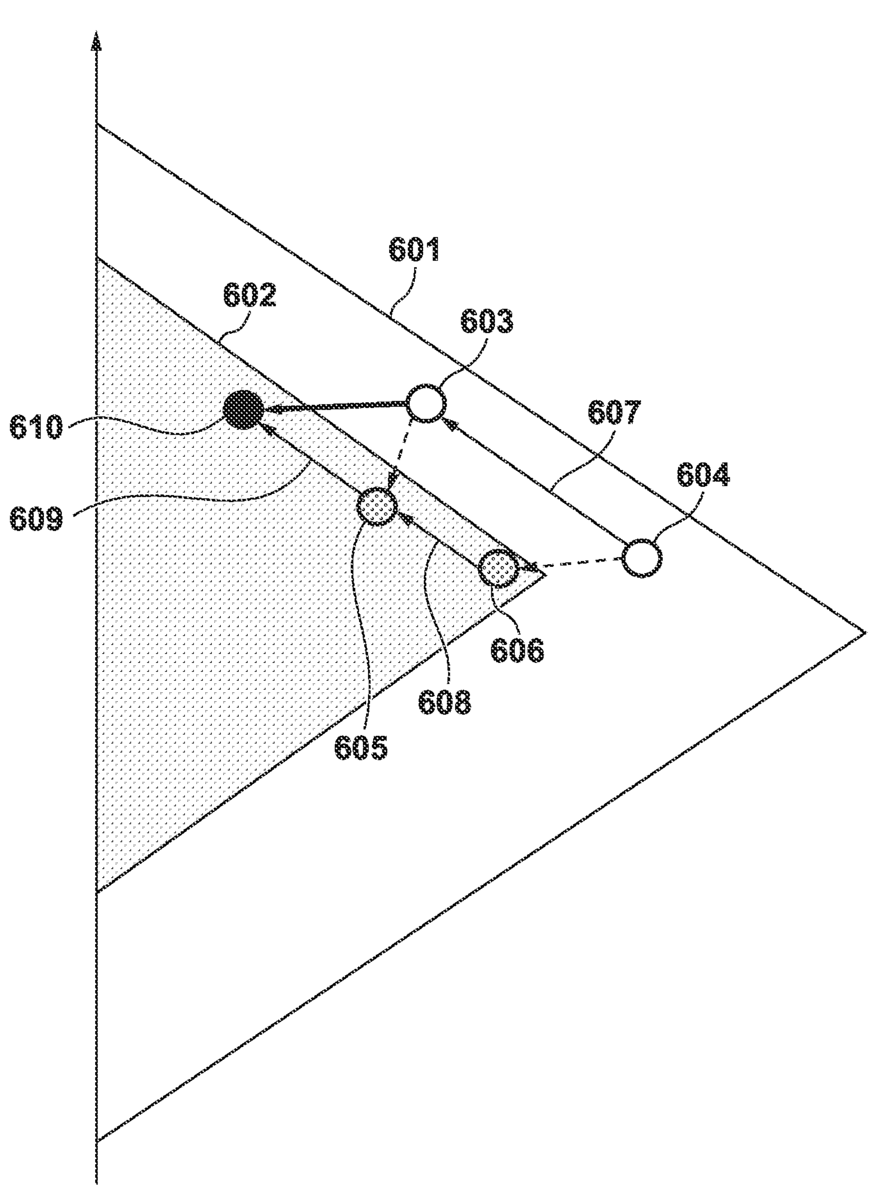
FIG. 9 is a view schematically showing color degeneration correction (first embodiment).

FIG. 9 is a view schematically showing color degeneration correction according to the first embodiment. A color gamut 601 is the color gamut of the input image data. A color gamut 602 is a color gamut after the gamut mapping in step S103. Colors 603 and 604 are included in the input image data. A color 605 is a color obtained by performing the gamut mapping for the color 603. A color 606 is a color obtained by performing the gamut mapping for the color 604. In a case where a color difference 608 between the colors 605 and 606 is smaller than a color difference 607 between the colors 603 and 604, it is determined that color degeneration has occurred. The determination processing is repeated as many times as the number of combinations of the colors in the unique color list.

As a color difference calculation method, a Euclidean distance in a color space is used. In this embodiment, a description will be made using a Euclidean distance (to be referred to as a color difference ΔE hereinafter) in the CIE-L*a*b* color space. Since the CIE-L*a*b* color space is a visual uniform color space, the Euclidean distance can be approximated into the change amount of the color. Therefore, a person perceives that the colors become closer as the Euclidean distance on the CIE-L*a*b* color space is smaller and that the colors are farther apart as the Euclidean distance is larger. The color information in the CIE-L*a*b* color space is represented in a color space with three axes of L*, a*, and b*. For example, the color 603 is represented by L603, a603, and b603. The color 604 is represented by L604, a604, and b604. The color 605 is represented by L605, a605, and b605. The color 606 is represented by L606, a606, and b606. If the input data is represented in another color space, it is converted into the CIE-L*a*b* color space using a known technique. The color difference ΔE 607 and the color difference ΔE 608 are calculated by:

$$\Delta E_{607} = \sqrt{(L_{603} - L_{604})^2 + (a_{603} - a_{604})^2 + (b_{603} - b_{604})^2} \tag{7}$$

$$\Delta E_{608} = \sqrt{(L_{605} - L_{606})^2 + (a_{605} - a_{606})^2 + (b_{605} - b_{606})^2} \tag{8}$$

In a case where the color difference ΔE 608 is smaller than the color difference ΔE 607, the CPU 102 determines that color degeneration has occurred. Furthermore, in a case where the color difference ΔE 608 does not have such magnitude that a color difference can be identified, the CPU 102 determines that color degeneration has occurred. This is because if there is such color difference between the colors 605 and 606 that the colors can be identified as different colors based on the human visual characteristic, it is unnecessary to correct the color difference. In terms of the visual characteristic, 2.0 may be used as the color difference ΔE with which the colors can be identified as different colors. That is, in a case where the color difference ΔE 608 is smaller than the color difference ΔE 607 and is smaller than 2.0, it may be determined that color degeneration has occurred.

In step S303, the CPU 102 determines whether the number of combinations of colors for which it is determined in step S302 that color degeneration has occurred is zero. If the number of colors for which color degeneration has occurred is zero, the process advances to step S304, and the CPU 102 determines that the region requires no color degeneration correction. If the number of colors for which color degeneration has occurred is not zero, the process advances to step S305, and color degeneration correction is performed for the region.

Note that if color degeneration correction (step S305) to be described below is performed, colors change. For this reason, a color change occurs even in the combinations of colors not subjected to color degeneration, and an unnecessary color change occurs. The necessity of color degeneration correction may be determined based on the total number of combinations of unique colors and the number of combinations of colors subjected to color degeneration. More specifically, in a case where the majority of all the combinations of the unique colors are combinations of the colors subjected to color degeneration, it may be determined that color degeneration correction is necessary. This can suppress a trouble of a color change caused by color degeneration correction.

In step S305, based on pixel data existing in a region, pixel data existing in the region after gamut mapping, and the gamut mapping table, the CPU 102 performs color degeneration correction for the combinations of the colors subjected to color degeneration.

A detailed description will be made with reference to FIG. 9 again. As described above, the colors 603 and 604 are input colors included in the region data. The color 605 is a color obtained by converting the color 603 by gamut mapping. The color 606 is a color obtained by converting the color 604 by gamut mapping. Referring to FIG. 9, the combination of the colors 603 and 604 represents color degeneration. The distance between the colors 605 and 606 on the color space is increased, thereby correcting color degeneration. More specifically, correction processing is performed to increase the distance between the colors to a distance equal to or larger than the distance with which the colors 605 and 606 can be identified as different colors based on the human visual characteristic. In terms of the visual characteristic, as the distance between the colors with which the colors can be identified as different colors, the color difference ΔE is set to 2.0 or more. More preferably, the color difference between the colors 605 and 606 is desirably equal to the color difference ΔE 607. The color degeneration correction processing is repeated as many times as the number of combinations of the colors subjected to color degeneration. As the result of color degeneration correction performed as many times as the number of combinations of the colors, the color information before correction and the color information after correction are held in a table. In FIG. 9, the color information is color information in the CIE-L*a*b* color space. Therefore, the information may be converted into the color spaces of the input image data and the output image data. In this case, color information before correction in the color space of the input image data and color information after correction in the color space of the output image data are held in a table.

Next, correction processing of correcting color degeneration will be described in detail. A color difference correction amount 609 that corrects color degeneration for increasing the color difference ΔE is obtained from the color difference 608. In terms of the visual characteristic, the difference between the color difference ΔE 608 and 2.0 which is the color difference ΔE with which the colors can be recognized as different colors is the color difference correction amount 609. More preferably, the difference between the color difference 607 and the color difference 608 is the color difference correction amount 609. The result of correcting the color 605 by the color difference correction amount 609 on an extension from the color 606 to the color 605 in the CIE-L*a*b color space is a color 610. The color 610 is separated from the color 606 by a color difference obtained by adding the color difference 608 and the color difference correction amount 609. The color 610 is on the extension from the color 606 to the color 605 in the above example, but this embodiment is not limited to this. As long as the color difference ΔE between the colors 606 and 610 is equal to the color difference obtained by adding the color difference ΔE 608 and the color difference correction amount 609, the direction can be any of the lightness direction, the chroma direction, and the hue angle direction in the CIE-L*a*b* color space. Not only one direction but also any combination of the lightness direction, the chroma direction, and the hue angle direction may be used. Furthermore, in the above example, color degeneration is corrected by changing the color 605 but the color 606 may be changed. Alternatively, both the colors 605 and 606 may be moved. If the color 606 is changed, the color 606 cannot be changed outside the color gamut 602, and thus the color 606 is moved to the boundary surface of the color gamut 602. With respect to the shortage of the color difference ΔE, color degeneration correction may be performed by changing the color 605.

In step S306, the CPU 102 changes the gamut mapping table using the color degeneration correction result in step S305. The gamut mapping table before the change is a table for converting the color 603 as an input color into the color 605 as an output color. In accordance with the result of step S305, the table is changed to a table for converting the color 603 as an input color into the color 610 as an output color. In this way, the color degeneration-corrected table can be created. The Gamut mapping table change is repeated as many times as the number of combinations of the colors subjected to color degeneration.

Note that if a region that satisfies the conditions not to execute color degeneration correction is integrated in step S105, the gamut mapping table need not be changed. The color 603 as an input color is mapped to the color 605 as an output color.

As described above, according to the first embodiment, by applying the color degeneration-corrected gamut mapping table to the region of the input image, the distance between the colors for each of the combinations of the colors subjected to color degeneration can be increased among the combinations of the unique colors included in the region. As a result, it is possible to reduce color degeneration with respect to the combinations of the colors subjected to color degeneration. This is because if the input image data is sRGB data, the gamut mapping table is created on the premise that the input image data has 16,777,216 colors. The gamut mapping table created on this premise is created in consideration of the color difference and chroma even for colors that are not included in the input image and region data. In this embodiment, it is possible to adaptively correct the gamut mapping table with respect to region data by detecting the colors included in the region data. Then, it is possible to create the gamut mapping table only for the colors included in the region data. As a result, it is possible to perform preferred adaptive gamut mapping for the region data, thereby reducing color degeneration.

Also, in this embodiment, the upper limit count L of application of the color degeneration correction table is determined in advance, whether to execute color degeneration correction is determined for each region in accordance with the priority order set for each region, and correction is executed. With this configuration, it is possible to perform the print operation of an entire image without stopping the operation of the printhead and reduce occurrence of unevenness due to the landing time difference at the time of print. In particular, if regions that satisfy the conditions not to execute color degeneration correction are integrated in advance, the number of regions to which the correction can be applied can be increased within the upper limit count L (the number of regions that can substantially be corrected is increased by regarding a plurality of regions that are separate before integration as one region).

Furthermore, in this embodiment, the processing in a case where the input image data includes one page has been explained. The same applies to a case where an original in which input image data includes a plurality of pages is handled. For an original including a plurality of pages, the processing procedure shown in FIG. 3 may be performed for each page. To calculate the required speed used in this embodiment, additional calculation for a plurality of pages may be applied assuming that a paper feed time or ink temperature control time is inserted for each page, or the processing shown in FIG. 3 may be performed for each page. As described above, even if the input image data includes a plurality of pages, it is possible to reduce the degree of color degeneration caused by gamut mapping.

In this embodiment, the color degeneration-corrected gamut mapping table is applied to the input image but a correction table for performing color degeneration correction may be created for the image data having undergone gamut mapping. In this case, based on the result of the color degeneration correction processing in step S305, a correction table for converting color information before correction into color information after correction may be generated. The generated correction table after gamut mapping is a table for converting the color 605 into the color 610 in FIG. 9. As described above, the degree of color degeneration by gamut mapping can be reduced by correcting image data after gamut mapping. Note that if regions that satisfy the conditions not to execute color degeneration correction are integrated in step S105, the color degeneration-corrected gamut mapping table need not be generated, and the color 603 as an input color is mapped to the color 605 as an output color.

Also, in this embodiment, the user may be caused to input whether to execute the processing. In this case, a user interface (UI) screen is displayed on a display mounted on the image processing apparatus or the printing apparatus, thereby making the user to do input.

Figure 10:
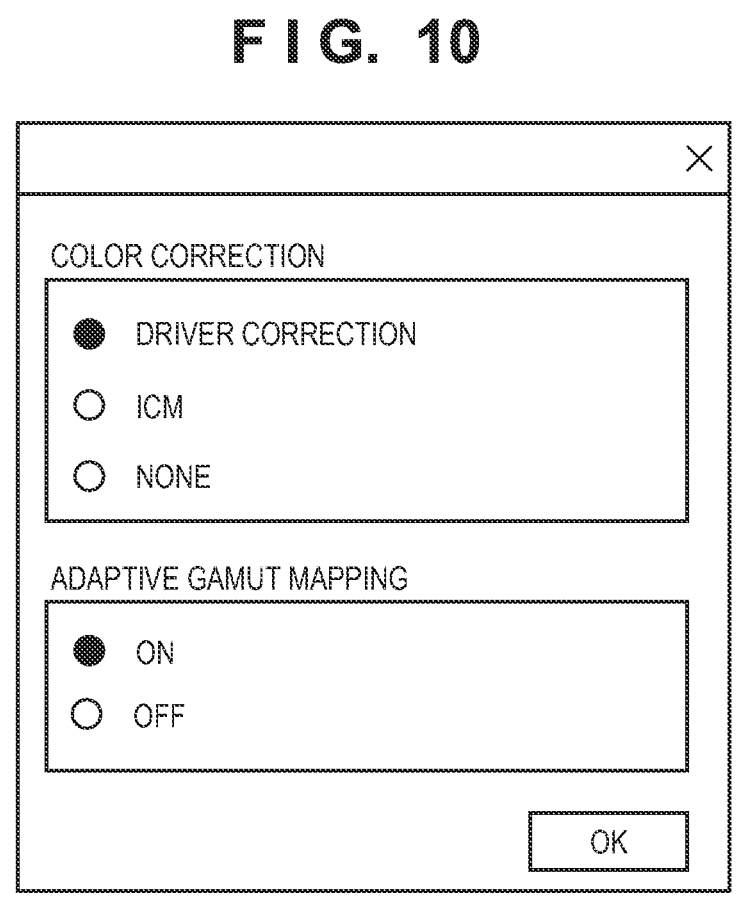

FIG. 10 is a view showing an example of a user input UI. FIG. 10 shows a configuration for accepting a setting of the type of color correction and the presence/absence of execution of the above-described adaptive gamut mapping. To cause the printer driver software to execute color correction processing, the user selects "driver correction". Also, for example, to execute color correction processing by standard processing of the operating system (OS), the user selects "ICM". "No correction" is selected not to execute color correction processing. When executing color correction, the user further selects, by ON/OFF, whether to execute the above-described adaptive gamut mapping. This makes it possible to execute adaptive gamut mapping when reducing the degree of color degeneration.

Second Embodiment

In the second embodiment, an example in which a plurality of unique colors is defined as one color group for each hue region, and color degeneration correction is executed in the same correction direction will be described. Note that the system configuration (FIG. 1) and the overall operation (FIG. 2) are the same as in the first embodiment, and a description thereof will be omitted.

Outline

In the above-described first embodiment, if color degeneration correction is performed such that the distance between colors is ensured for all colors in a region for each single color, the degree of color degeneration decreases, but a tint may change. More specifically, if color degeneration correction is performed for two colors (for example, blue and purple) having different hue angles, the tint may be different from the tint in input image data (for example, purple may change to red). Also, in the first embodiment, color degeneration correction needs to be repeated for the combinations of colors included in region data. For this reason, if the number of unique colors included in each region data is large, enormous calculation processing is needed, and the processing time increases.

To cope with this, in the second embodiment, to correct a plurality of unique colors as one color group, a unique color serving as a reference is selected from the color group. By limiting the correction direction to the lightness direction (suppressing correction in the hue angle direction), it is possible to suppress a change of a tint. By performing correction by setting a plurality of unique colors as one color group, it is unnecessary to perform processing for all the combinations of the colors included in region data, thereby reducing the processing time.

Operation of Apparatus

Figure 11:
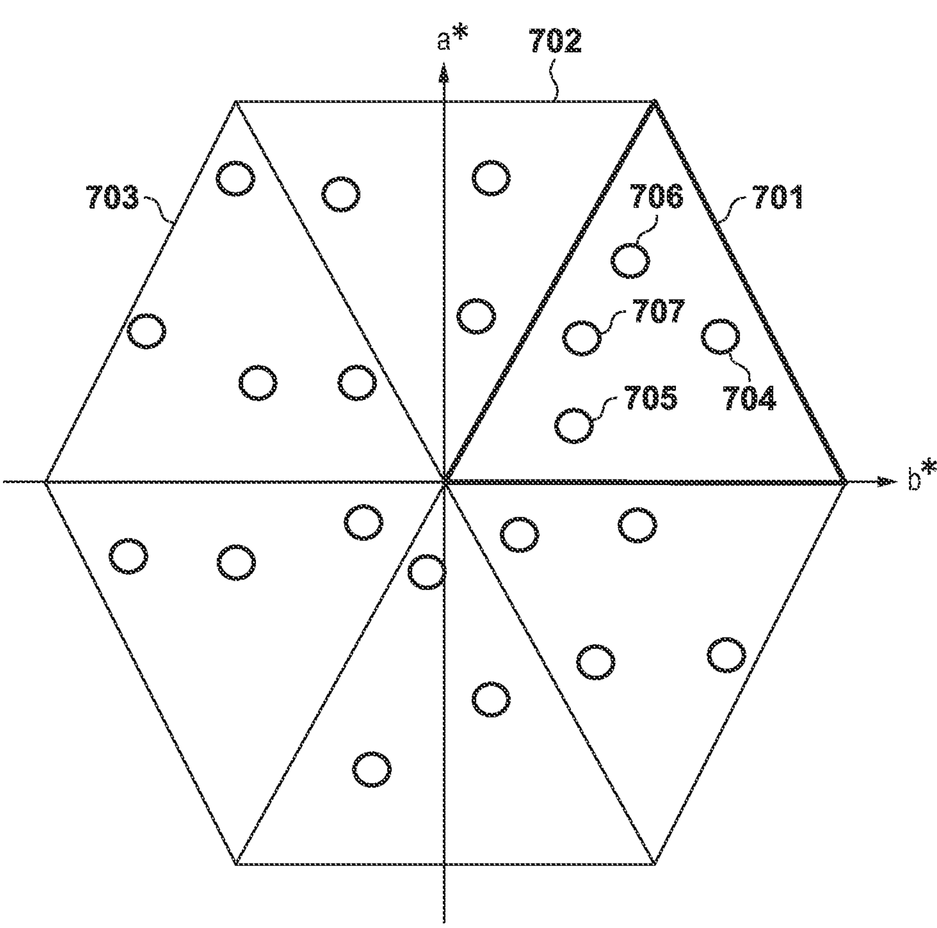
FIG. 11 is a view schematically showing color difference determination (second embodiment).

FIG. 11 is a view schematically showing color difference determination (step S302) according to the second embodiment. More specifically, FIG. 11 is a view showing, as a plane, two axes of the a* axis and the b* axis in the CIE-L*a*b* color space.

A hue range 701 indicates a range within which a plurality of unique colors between two predetermined hue angles is set as one color group. Referring to FIG. 11, the entire hue (360°) is equally divided into six parts, and the hue range 701 indicates a hue range of hue angles of 0° to 60°. The number of hue ranges is preferably small from the viewpoint of a processing amount, and colors in each hue range are preferably recognized as identical colors. Hence, the hue angle in the CIE-L*a*b* color space is preferably 30° (divided into 12 parts) to 60° (divided into 6 parts). If the hue angle is 60°, six colors of red, green, blue, cyan, magenta, and yellow can be divided. Note that the hue range may be decided fixedly, as shown in FIG. 11. Alternatively, the hue range may be decided in accordance with unique colors included in input image data.

By the above-described processing, a CPU 102 detects the number of combinations of colors subjected to color degeneration with respect to the combinations of the unique colors of region data within the hue range 701. Referring to FIG. 11, colors 704, 705, 706, and 707 indicate input colors. In FIG. 11, it is determined whether color degeneration has occurred for combinations of the four colors 704, 705, 706, and 707. This processing is repeated for all the hue ranges. The number of combinations of the colors subjected to color degeneration can thus be detected for each hue range. In FIG. 11, six combinations of the colors subjected to color degeneration are detected. In this embodiment, the hue range is set by equally dividing the entire hue by a hue angle of 60°. However, a hue range of another hue angle may be decided, or the hue range may be decided without equally dividing the angle. The hue angle range is preferably decided as a hue range so as to obtain visual uniformity. Since colors in the same color group are visually perceived as identical colors, it is possible to perform color degeneration correction for the identical colors. Furthermore, the number of combinations of colors subjected to color degeneration within two hue ranges including adjacent hue ranges may be detected for each hue range.

Figure 12:
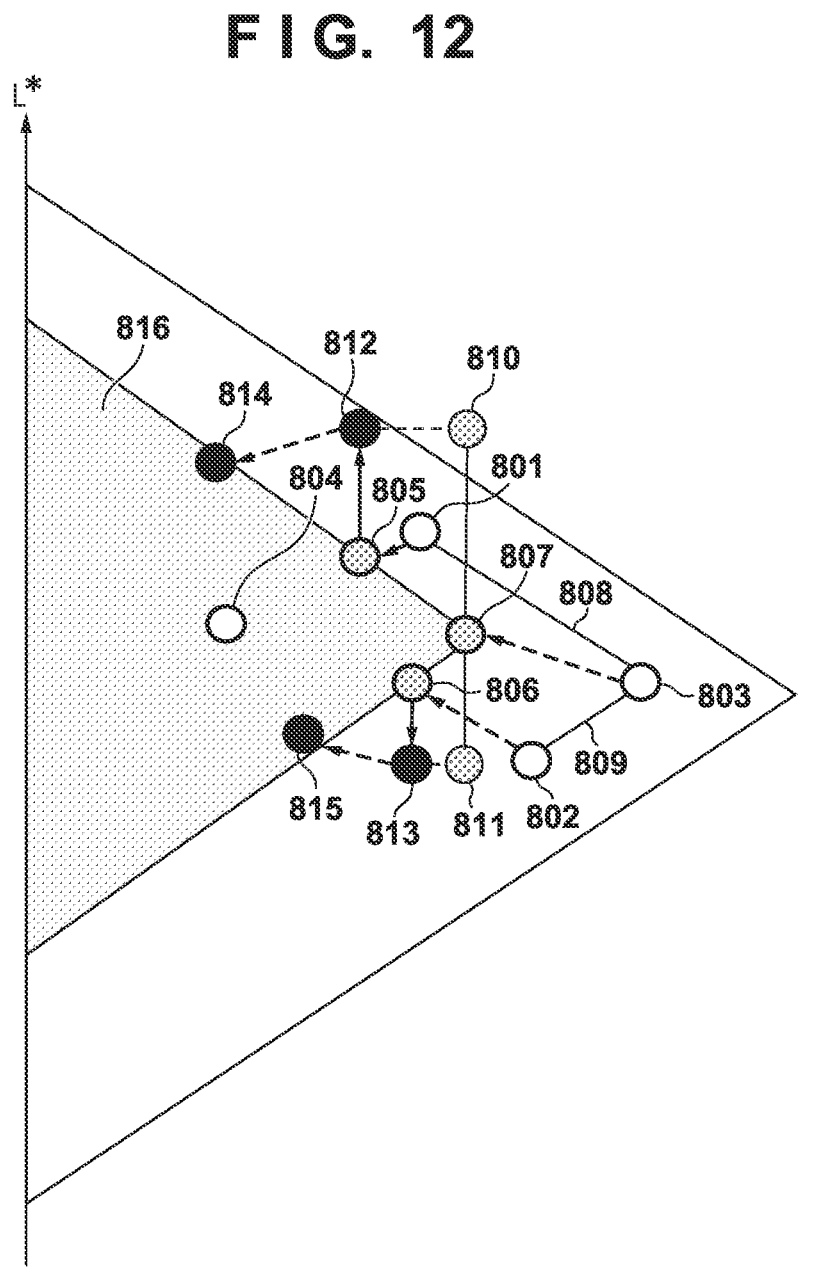

FIG. 12 is a view schematically showing color degeneration correction (step S305) according to the second embodiment. FIG. 12 is a view showing, as a plane, two axes of the L* axis and the C* axis in the CIE-L*a*b* color space. L* represents lightness and C* represents chroma. In FIG. 12, colors 801, 802, 803, and 804 are input colors. The colors 801, 802, 803, and 804 indicate colors included in the hue range 701 in FIG. 11. A color 805 is a color obtained after performing color conversion for the color 801 by gamut mapping. A color 806 is a color obtained after performing color conversion for the color 802 by gamut mapping. A color 807 is a color obtained after performing color conversion for the color 803 by gamut mapping. The color 804 indicates that the color obtained after performing color conversion by gamut mapping is the same color.

First, the CPU 102 decides a unique color (reference color) as the reference of the color degeneration correction processing for each hue range. As a preferred example, the maximum lightness color, the minimum lightness color, and the maximum chroma color are decided as reference colors. In FIG. 12, the color 801 is the maximum lightness color, the color 802 is the minimum lightness color, and the color 803 is the maximum chroma color. Next, the CPU 102 calculates, for each hue range, a correction ratio R from the number of combinations of colors and the number of combinations of colors subjected to color degeneration within the target hue range. For example, correction ratio R=number of combinations of colors subjected to color degeneration/number of combinations of unique colors is calculated. The correction ratio R is lower as the number of combinations of colors subjected to color degeneration is smaller, and is higher as the number of combinations of colors subjected to color degeneration is larger.

As described above, as the number of combinations of the colors subjected to color degeneration is larger, color degeneration correction can be performed more strongly. FIG. 12 shows that there are four colors within the hue range 701 in FIG. 11. Therefore, there are six combinations of unique colors. Assume that there are four combinations of colors subjected to color degeneration. In this case, the correction ratio is "0.667". In FIG. 12, color degeneration has occurred for all the combinations due to gamut mapping. However, even after gamut mapping, if the color difference is larger than the identifiable smallest color difference, the colors are not included as in the colors subjected to color degeneration. Thus, the combination of the colors 804 and 803 and the combination of the colors 804 and 802 are not included as the combinations of colors subjected to color degeneration. The identifiable smallest color difference ΔE is, for example, "2.0".

Next, the CPU 102 calculates, for each hue range, a correction amount based on the correction ratio R and pieces of color information of the maximum lightness, the minimum lightness, and the maximum chroma. As correction amounts, a correction amount Mh on a side brighter than the maximum chroma color and a correction amount Ml on a side darker than the maximum chroma color are calculated. The color 801 as the maximum lightness color is represented by L801, a801, and b801. The color 802 as the minimum lightness color is represented by L802, a802, and b802. The color 803 as the maximum chroma color is represented by L803, a803, and b803. The preferred correction amount Mh is a value obtained by multiplying the color difference ΔE between the maximum lightness color and the maximum chroma color by the correction ratio R. The preferred correction amount Ml is a value obtained by multiplying the color difference ΔE between the maximum chroma color and the minimum lightness color by the correction ratio R. The formulas of The correction amounts Mh and Ml are:

$$Mh = \sqrt{(L_{801} - L_{803})^2 + (a_{801} - a_{803})^2 + (b_{801} - b_{803})^2} \times R \tag{9}$$

$$Ml = \sqrt{(L_{802} - L_{803})^2 + (a_{802} - a_{803})^2 + (b_{802} - b_{803})^2} \times R \tag{10}$$

As described above, the color difference ΔE to be held after gamut mapping can be calculated. The color difference ΔE to be held after gamut mapping is the color difference ΔE before gamut mapping. In FIG. 12, the correction amount Mh is a value obtained by multiplying a color difference 808 by the correction ratio R, and the correction amount Ml is a value obtained by multiplying a color difference ΔE 809 by the correction ratio R. Furthermore, if the color difference ΔE before gamut mapping is larger than the identifiable smallest color difference, the color difference ΔE to be held need only be larger than the identifiable smallest color difference ΔE. By performing the processing in this way, it is possible to recover the color difference ΔE, that has decreased due to gamut mapping, to the identifiable color difference ΔE. The color difference ΔE to be held may be the color difference ΔE before gamut mapping. In this case, it is possible to make identifiability close to that before gamut mapping. The color difference ΔE to be held may be larger than the color difference before gamut mapping. In this case, it is possible to make identification easier than before gamut mapping.

Next, the CPU 102 generates a color degeneration correction table for each hue range. The color degeneration correction table is a correction table for expanding lightness in the lightness direction based on the lightness of the maximum chroma color and the correction amounts Mh and Ml. In FIG. 12, the lightness of the maximum chroma color is lightness L803 of the color 803. The correction amount Mh is the color difference ΔE 808. The correction amount Ml is the color difference ΔE 809. A method of creating a table for expanding lightness in the lightness direction will be described below. The correction table for expanding lightness in the lightness direction is a 1DLUT. The input is lightness before correction, and the output lightness is lightness after correction. The lightness after correction is decided by three values including minimum lightness after correction, the lightness of the maximum chroma color after gamut mapping, and maximum lightness after correction. The maximum lightness after correction is lightness obtained by adding the correction amount Mh to the lightness of the maximum chroma color. The minimum lightness after correction is lightness obtained by subtracting the correction amount Ml from the lightness of the maximum chroma color after gamut mapping.

The table for expanding lightness in the lightness direction is created by linearly changing the minimum lightness after correction to the lightness of the maximum chroma color after gamut mapping and linearly changing the lightness of the maximum chroma color after gamut mapping to the minimum lightness after correction. In FIG. 12, the maximum lightness before correction is lightness L805 of the color 805 as the maximum lightness color. The minimum lightness before correction is lightness L806 of the color 806 as the minimum lightness color. The lightness of the maximum chroma color after gamut mapping is lightness L807 of the color 807. The maximum lightness after correction is lightness L810 obtained by adding the color difference ΔE 808 as the correction amount Mh to the lightness L807. The minimum lightness after correction is lightness L811 obtained by subtracting the color difference 809 as the correction amount Ml from the lightness L807.

Figure 13:
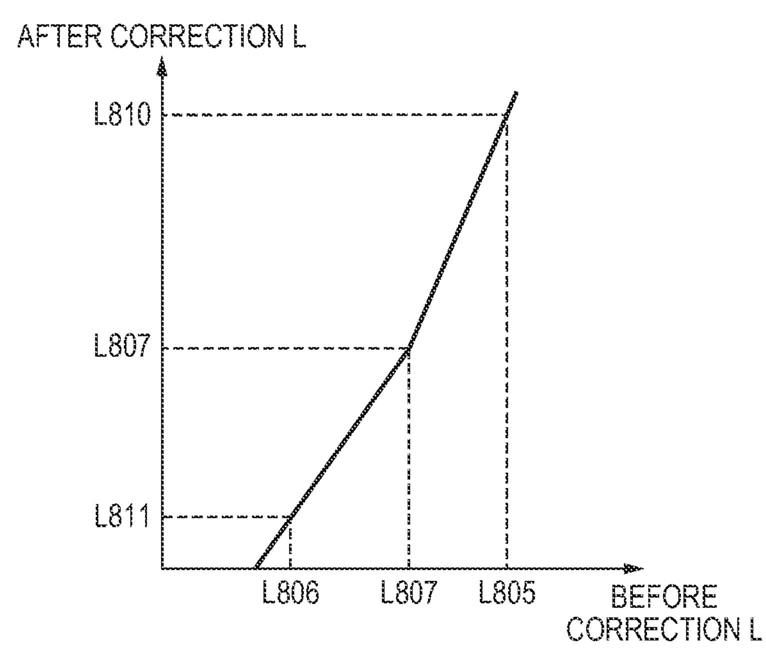
FIG. 13 is a view showing a graph of a lightness correction table.

FIG. 13 is a view showing a graph of a lightness correction table. More specifically, FIG. 13 shows a correction table for expanding lightness in the lightness direction in FIG. 12. In this embodiment, as a preferred example, color degeneration correction is performed by converting the color difference ΔE into the lightness difference. Sensitivity to the lightness difference is high because of the visual characteristic. Therefore, by converting the chroma difference into a lightness difference, it is possible to make the user feel the color difference despite a small lightness difference because of the visual characteristic. In addition, the lightness difference is smaller than the chroma difference because of the relationship between the sRGB color gamut and the color gamut of a printing apparatus. Therefore, it is possible to effectively use the narrow color gamut by conversion into a lightness difference. In this embodiment, the lightness of the maximum chroma color is not changed, as a preferred example. As described above, since the color with the highest chroma is not changed, it is possible to correct the color difference ΔE while maintaining the chroma. Correction of a value larger than the maximum lightness and a value smaller than the minimum lightness may be undefined since these values are not included in the input image data. If the correction table is used using complementation, a value larger than the maximum lightness and a value smaller than the minimum lightness are also referred to. Hence, as shown in FIG. 13, a value may be set to obtain a linear change. As described above, it is possible to decrease the number of grids of the correction table to reduce the capacity, and to reduce the processing time taken to transfer the correction table.

If the maximum lightness after correction exceeds the maximum lightness of the color gamut after gamut mapping, the CPU 102 performs maximum value clip processing. In the maximum value clip processing, the difference between the maximum lightness after correction and the maximum lightness of the color gamut after gamut mapping is subtracted in the whole correction table. In this case, the lightness of the maximum chroma color after gamut mapping is also changed to the low lightness side. As described above, if the unique colors included in the input image data are localized to the high lightness side, it is possible to improve the color difference ΔE by using the lightness tone on the low lightness side. If the minimum lightness after correction is lower than the minimum lightness of the color gamut after gamut mapping, the CPU 102 performs minimum value clip processing. In the minimum value clip processing, the difference between the minimum lightness after correction and the minimum lightness of the color gamut after gamut mapping is added in the whole correction table. As described above, if the colors included in the input image data are localized to the low lightness side, it is possible to reduce lowering of the color difference by using the lightness tone on the high lightness side.

Next, the CPU 102 applies, to the gamut mapping table, the color degeneration correction table created for each hue range. First, based on color information held by the output value of the gamut mapping, the color degeneration correction table of a specific hue angle to be applied is decided. For example, if the hue angle of the output value of the gamut mapping is 25°, the color degeneration correction table in the hue range 701 in FIG. 11 is applied. Then, the decided color degeneration correction table is applied to the output value of the gamut mapping table to perform correction. The color information after correction is set as a new output value after the gamut mapping.

As described above, the color degeneration correction table created based on the reference color is also applied to a color other than the reference color, thereby limiting the correction direction to the lightness direction and thus suppressing a change of a tint. Furthermore, it is unnecessary to perform color degeneration correction processing for all the combinations of colors included in the input image data, thereby making it possible to reduce the processing time.

In addition, in accordance with the hue angle of the output value of the gamut mapping, the color degeneration correction tables of adjacent hue ranges may be blended. For example, if the hue angle of the output value of the gamut mapping is Hn°, the color degeneration correction table of the hue range 701 and that of a hue range 702 are blended. More specifically, the lightness value of the output value after the gamut mapping is corrected by the color correction table of the hue range 701 to obtain a lightness value Lc701. The lightness value of the output value after the gamut mapping is corrected by the color correction table of the hue range 702 to obtain a lightness value Lc702. The intermediate hue angle of the hue range 701 is an angle H701, and the intermediate hue angle of the hue range 702 is an angle H702. According to each hue angle, the corrected lightness value Lc701 and the corrected lightness value Lc702 are complemented by the hue angle of the output value after the gamut mapping. The formula is $$Lc = \left|\frac{Hn - H_{701}}{H_{702} - H_{701}}\right| \times Lc_{701} + \left|\frac{Hn - H_{702}}{H_{702} - H_{701}}\right| \times Lc_{702} \quad (11)$$

As described above, by blending the color degeneration correction tables to be applied, in accordance with the hue angle, it is possible to reduce a sudden change of correction intensity caused by a change of the hue angle.

If the color space of the color information after correction is different from the color space of the output value after gamut mapping, the color space is converted and set as the output value after gamut mapping. For example, if the color space of the color information after correction is the CIE-L*a*b* color space, a search is performed to obtain an output value after gamut mapping.

If the value after correction exceeds the color gamut after gamut mapping, mapping to the color gamut after gamut mapping is performed. A preferable mapping method is color difference minimum mapping that focuses on lightness and hue. In color difference minimum mapping that focuses on lightness and hue, the color difference ΔE is calculated by equations (12) to (16) below. In the CIE-L*a*b* color space, color information of a color exceeding the color gamut is represented by Ls, as, and bs. Color information of a color within the color gamut after gamut mapping is represented by Lt, at, and bt. ΔL represents a lightness difference, ΔC represents a chroma difference, and ΔH represents a hue difference. In addition, Wl represents a weight of lightness, Wc represents a weight of chroma, Wh represents a weight of a hue angle, and ΔEw represents a weighted color difference.

$$\Delta E = \sqrt{(L_s - L_t)^2 + (a_s - a_t)^2 + (b_s - b_t)^2} \quad (12)$$

$$\Delta L = \sqrt{(L_s - L_t)^2} \quad (13)$$

$$\Delta C = \sqrt{(a_s - a_t)^2 + (b_s - b_t)^2} \quad (14)$$

$$\Delta H = \Delta E - (\Delta L + \Delta C) \quad (15)$$

$$\Delta Ew = Wl \times \Delta L + Wc \times \Delta C + Wh \times \Delta H \quad (16)$$

Since the color difference ΔE is expanded in the lightness direction, color degeneration correction can be correctly performed by performing mapping focusing on lightness more than chroma. That is, the weight Wl of lightness is larger than the weight Wc of chroma. Furthermore, since hue largely influences a tint, it is possible to minimize a change of the tint before and after correction by performing mapping focusing on hue more than lightness and chroma. That is, the weight Wh of hue is equal to or larger than the weight Wl of lightness, and is larger than the weight Wc of chroma. As described above, it is possible to correct the color difference ΔE while maintaining a tint.

Furthermore, the color space may be converted at the time of performing color difference minimum mapping. It is known that in the CIE-L*a*b* color space, a color change in the chroma direction does not obtain the same hue. Therefore, if a change of the hue angle is suppressed by increasing the weight of hue, mapping to a color of the same hue is not performed. Thus, the color space may be converted into a color space in which the hue angle is bent so that the color change in the chroma direction obtains the same hue. As described above, by performing color difference minimum mapping by weighting, it is possible to suppress a change of a tint.

Referring to FIG. 12, the color 805 obtained after performing gamut mapping for the color 801 is corrected to the color 812 by the color degeneration correction table. Since the color 812 exceeds the color gamut 816 after gamut mapping, the color 812 is mapped to the color gamut 816. The color 812 is mapped to the color 814. As a result, with respect to the gamut mapping table after correction, if the color 801 is input, the color 814 is output.

In this embodiment, the color degeneration correction table is created for each hue range. The color degeneration correction table may be created by combining with that of the adjacent hue range. More specifically, within a hue range obtained by combining the hue ranges 701 and 702 in FIG. 11, the number of combinations of colors subjected to color degeneration is detected. Next, within a hue range obtained by combining the hue range 702 and a hue range 703, the number of combinations of colors subjected to color degeneration is detected. By performing detection by overlapping each hue range, it is possible to suppress a sudden change of the number of combinations of colors subjected to color degeneration, at the time of crossing the hue ranges. In this case, a preferred hue range is a hue angle range obtained by combining two hue ranges, within which colors can be recognized as identical colors. For example, the hue angle in the CIE-L*a*b* color space is 30°. That is, one hue angle range is 15°. This can suppress a sudden change of correction intensity over hue ranges.

In this embodiment, the color difference ΔE is corrected in the lightness direction by setting a plurality of unique colors as one group. As the visual characteristic, sensitivity to the lightness difference changes depending on chroma. Sensitivity to the lightness difference of low chroma is higher than sensitivity to the lightness difference of high chroma. Therefore, the correction amount in the lightness direction may be controlled by a chroma value. For low chroma, correction is performed such that the correction amount is small. For high chroma, correction is performed using the above-described correction amount. More specifically, when applying the color degeneration correction table to the gamut mapping table, the lightness value Ln before correction and the lightness value Lc after correction are divided by a chroma correction ratio S. The chroma correction ratio S is calculated based on a chroma value Sn of the output value after gamut mapping and a maximum chroma value Sm of the color gamut after gamut mapping at the hue angle of the output value after gamut mapping. The formulas are $$S = Sn/Sm \quad (17)$$

$$Lc' = S \times Lc + (1 - S) \times \mathrm{Ln} \quad (18)$$

Furthermore, the correction amount may be set to zero in a low-chroma color gamut. In the above-described way, it is possible to suppress a color change around a gray axis. As described above, since color degeneration correction can be performed in accordance with the visual sensitivity, it is possible to suppress excessive correction.

As described above, according to the second embodiment, color degeneration correction is performed in the same correction direction while defining a plurality of unique colors as one color group for each hue region. If a predetermined hue angle is set in the same correction direction, it is possible to suppress conversion to a tint different from the tint in the input image data in color degeneration correction.

Third Embodiment

In the third embodiment, a configuration will be described in which after a mapping table for color degeneration correction is deployed in a cache memory, "a y-coordinate range where a region to execute color degeneration correction exists" in image data is scanned, and mapping is executed for each pixel corresponding to the application destination of the table.

In the above-described first and second embodiments, a configuration has been described in which after a mapping table for color degeneration correction is deployed in a cache memory, whole image data is scanned, and mapping is executed for each pixel corresponding to the application destination of the deployed table. According to the configuration of the first and second embodiments, whole image data needs to be scanned. Hence, wasteful processing such as scanning a range occupied by pixels that do not correspond to the application destination occurs, resulting in a decrease of the processing speed.

To prevent this, in the third embodiment, not whole image data but only a range where a color degeneration correction target region exists is scanned, thereby shortening the image processing time. This makes it possible to select more regions as the color degeneration correction target region relative to the required processing time.

Figure 14:
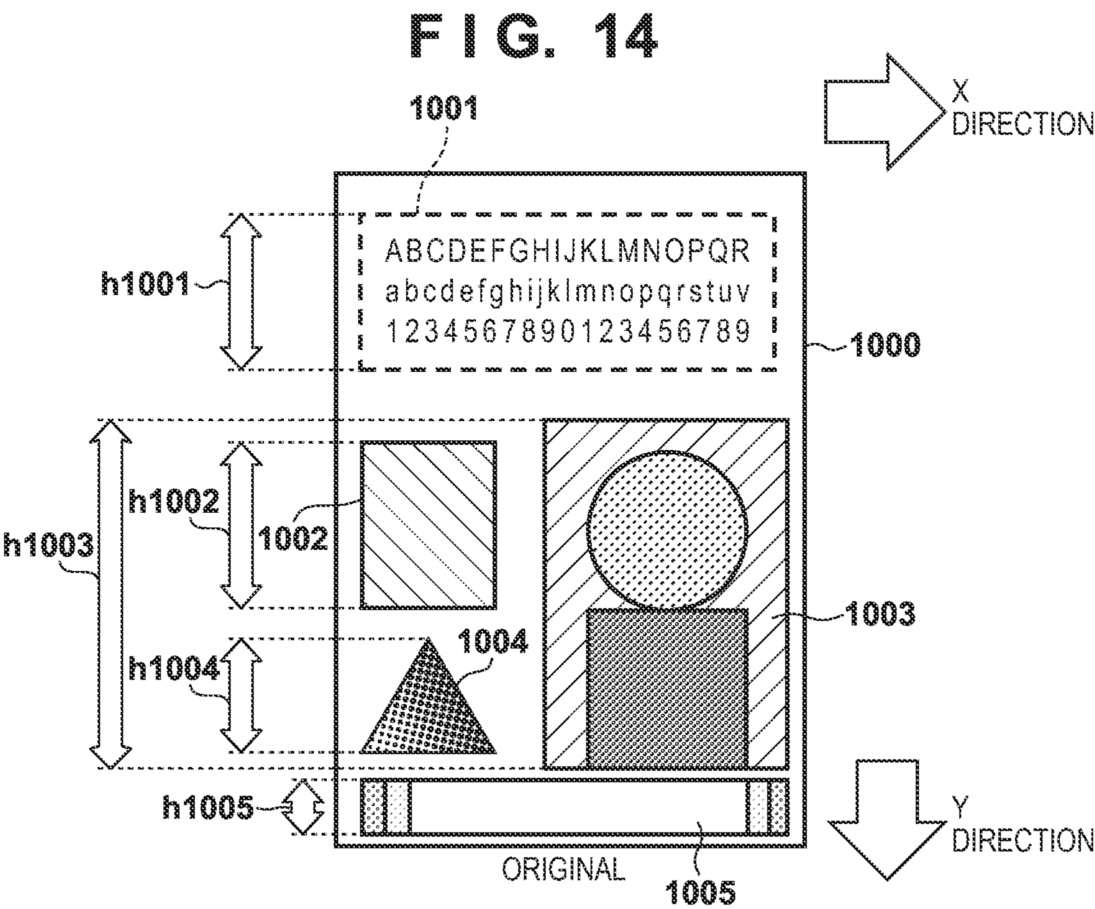
FIG. 14 is a view showing an example of image data.

FIG. 14 is a view showing an example of image data of a processing target according to the third embodiment. For example, FIG. 14 shows an example of image data of one page included in an original created by a user. Image data 1000 includes five image regions. Regions 1001, 1002, 1003, 1004, and 1005 exist with heights h1001, h1002, h1003, h1004, and h1005 in the Y direction of the image data. In the Y direction, an image processing pipeline 1301 defines, for example, (X, Y)=(0, 0) in the image data as the origin and performs image processing for pixels sequentially in the X direction. There can be considered a processing procedure of performing scan up to the end portion in the X direction, incrementing the coordinate by one in the Y direction, and flowing pixels in the X direction sequentially from the coordinates (0, 1) again. With this processing procedure, the region to scan by one image processing pipeline can be limited.

Figure 15:
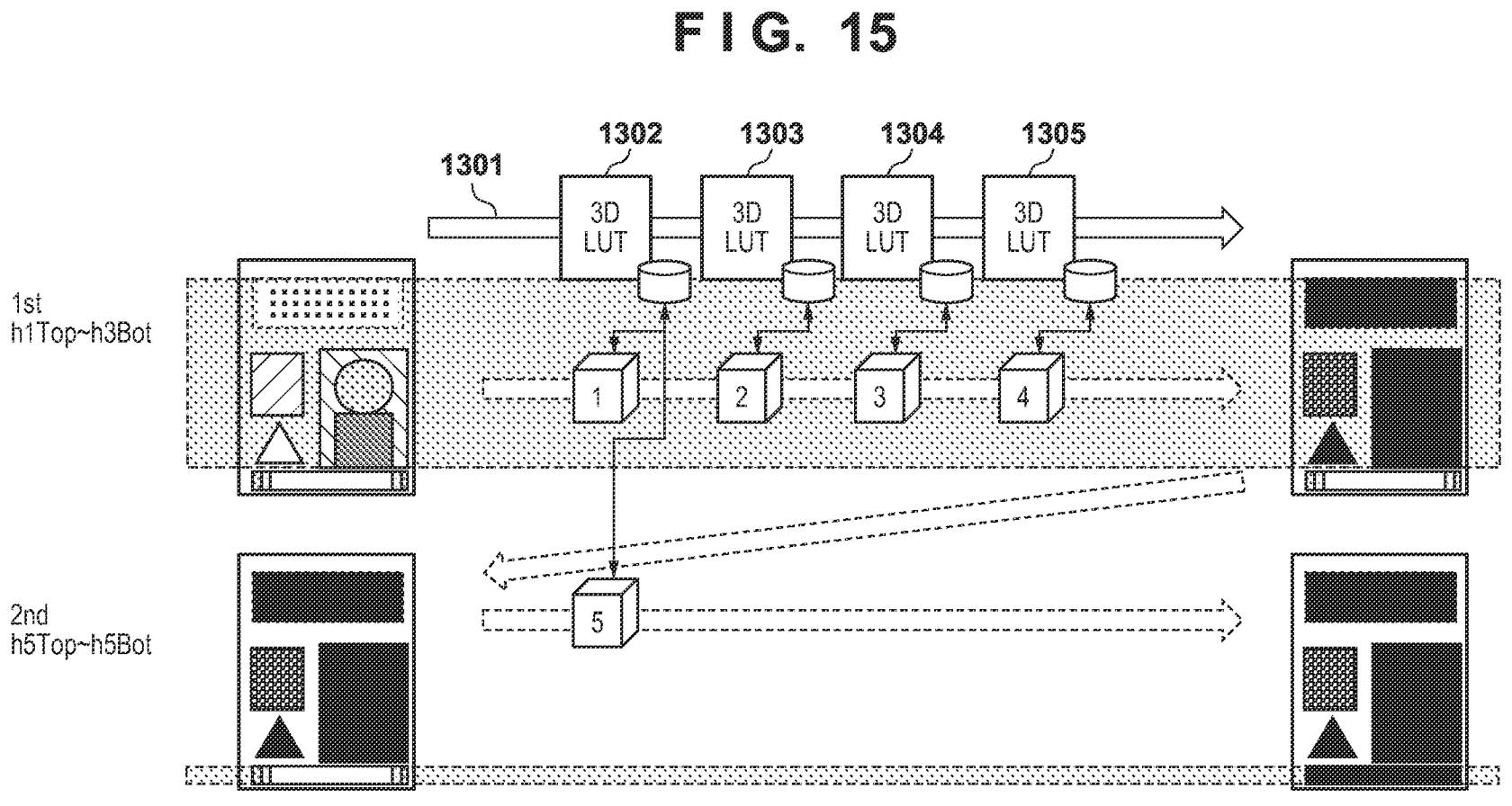

FIG. 15 is a view schematically showing an image processing pipeline according to the third embodiment. In an example in which image processing is executed for the image data shown in FIG. 14, a hatched portion corresponds to processing target pixels in each of two pipelines. Note that in FIG. 15, a region to which the color degeneration correction table has already been applied is expressed as a black region.

When processing the regions 1001 to 1004 by the first pipeline processing, a y-coordinate TOP of the region located at the uppermost end among the four regions is set to the start pixel of image processing, and a range up to a y-coordinate BOTTOM of the region located at the lowermost end among the four regions is set to the application range of image processing. When processing the region 1005 by the second pipeline processing, the y-coordinate TOP of the region 1005 is set to the start pixel of image processing, and a range up to the y-coordinate BOTTOM of the region 1005 is set to the application range of image processing.

In the execution method according to the first embodiment, scan needs to be performed twice for one page in two pipeline processes. However, the processing speed improves if scan is performed only for necessary regions. Hence, the color degeneration correction table can be executed for more regions with respect to the required speed as compared to the first and second embodiments.

To set a correction upper limit count L for execution of this embodiment, for example, not speed [pixel/sec] but processing time [sec/page] can effectively be used in equation (4) or (5). For example, to print image data at the speed of equation (4), equation (19) is used.

$$\text{required processing time } [\text{sec/page}] = \text{required speed } [\text{pixel/sec}] \div Pix \tag{19}$$

Pix in equation (19) indicates the number of pixels of image data. In the image processing, the processing result of the entire image data need only be generated in a time shorter than the processing time required in equation (19). In an example of FIG. 15, to correct the four regions 1001, 1002, 1003, and 1004, S is set to 1 under the conditions of the image processing pipeline 1301 in which C=4. Since scan of pixels is needed only for the y-coordinate positions where the regions 1001, 1002, 1003, and 1004 exist, the processing time when processing the four regions is obtained by $$\text{processing time } A\ [\text{sec}/Obj\ \ 1001 \text{ to } 1004] = \text{processing speed } [\text{pixel/sec}] \div (Pix \times (YBot - YTop)) \tag{20}$$

In equation (20), the processing time needed to process the four regions can be obtained. YBot indicates the y-coordinate value at the lowermost end among the pixels existing in the four regions. YTop indicates the y-coordinate value at the uppermost end among the pixels existing in the four regions. Assume that even for the region 1005, a processing time B[sec/Obj1005] is obtained by the same method. Then, the total processing time of image processing for the whole image data can be obtained by $$\text{processing time } [\text{sec/page}] = \text{processing time } A\ [\text{sec}/Obj\ \ 1001 \text{ to } 1004] + \text{processing time } B\ [\text{sec}/Obj\ \ 1005] \tag{21}$$

Equation (19) and equation (21) are compared, thereby obtaining the correction upper limit count. If equation (21) exceeds equation (19), the correction upper limit count is obtained such that the region 1005 concerning the processing time B is set to a region not to execute color degeneration correction. It is possible to implement control not to apply correction by setting a sufficiently low correction priority for a region set to the region not to execute color degeneration correction at this time.

In the example of FIG. 15, the processing is divisionally performed for the regions 1001 to 1004 and the region 1005. However, the division method is not limited to this. The result of equation (21) changes if the division method is variously changed. For this reason, an attempt to use a division method that satisfies the requirement of equation (19) is also possible.

As described above, according to the third embodiment, a configuration in which only a range where a region of a color degeneration correction target exists is scanned has been described. Since the image processing time can be shortened by decreasing the pixels of the scan target, the number of regions of the color degeneration correction target can be increased as compared to the first and second embodiments.

Modification 1

In the above-described first to third embodiments, the upper limit of the number of correctable regions is decided for whole image data. However, the upper limit of the number of correctable regions may be decided in the unit of head length based on the required speed. With this configuration, color degeneration correction can sometimes be applied to more regions as compared to the first to third embodiments while suppressing stop of the printhead.

Figure 16:
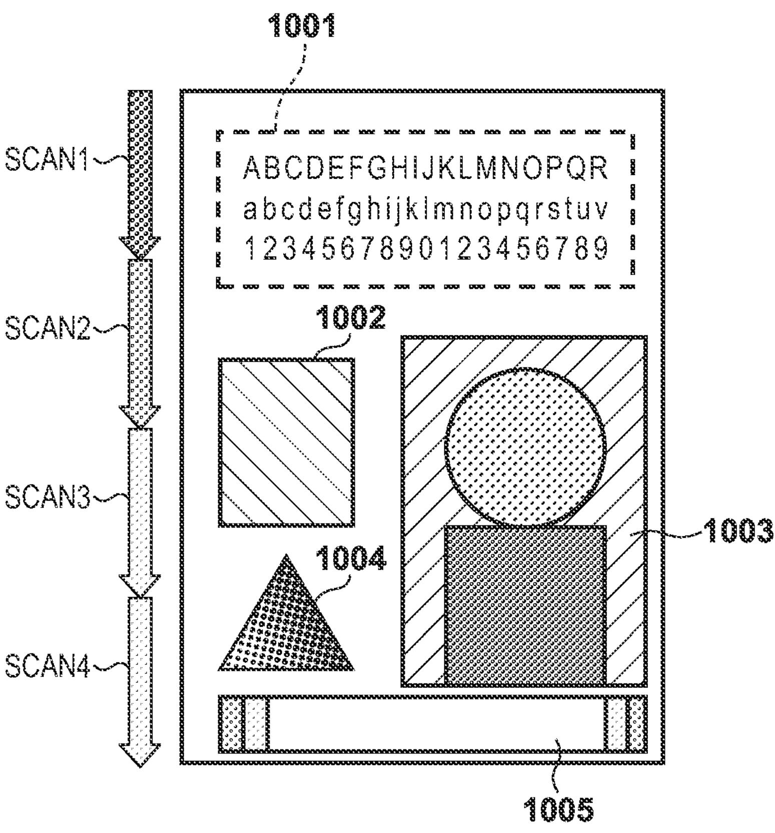
FIG. 16 is a view showing the relationship between image data and each scan region.

FIG. 16 is a view showing an example of the relationship between image data and each scan region. Each of SCAN1 to SCAN4 indicates a Y position when the printhead moves in a page in the X direction. To complete print of the whole page, the paper position is adjusted such that the printhead can scan on the SCAN1 region, and the printhead scans a necessary number of times. Next, the paper position is adjusted such that the printhead can scan on the SCAN2 region, and the printhead operates a necessary number of times of scan. This also applies to SCAN3 and SCAN4.

If the whole page can be printed by four times of scan (SCAN1 to SCAN4) as described above, execution of the color degeneration correction table for the region 1001 belonging to SCAN1 needs to have been completed at the start of print of the SCAN1 region. At the start of print of the SCAN2 region, execution of the color degeneration correction table needs to have been completed for a part of the region 1002 and a part of the region 1003. At the start of print of the SCAN3 region, execution of the color degeneration correction table needs to have been completed for a part of the region 1002, a part of the region 1003, and a part of the region 1004. At the start of print of the SCAN4 region, execution of the color degeneration correction table needs to have been completed for a part of the region 1004 and the region 1005. Hence, the upper limit of the number of correctable regions is decided based on not the required processing time in the whole page but the required speed in each SCAN region.

Figure 17:
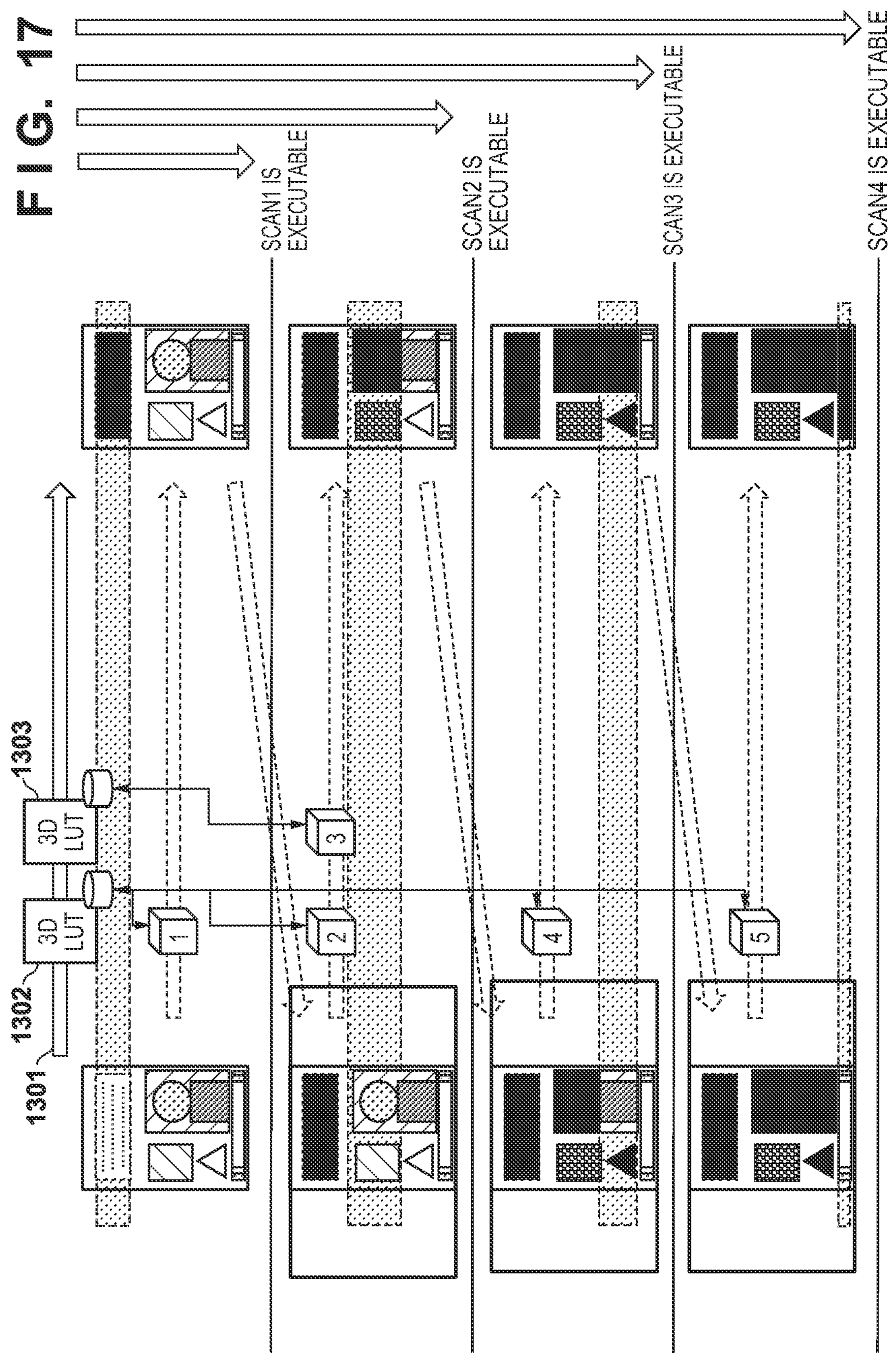
FIG. 17 is a view schematically showing an image processing pipeline (Modification 1).

FIG. 17 is a view schematically showing an image processing pipeline according to Modification 1. For the sake of simple explanation, the number of 3DLUTs is two (3DLUTs 1302 and 1303). Also, only one pipeline processing is permitted in each SCAN (L=2). In this case, pipeline processing for creating data necessary for each SCAN is configured as shown in FIG. 17.

For example, if the first pipeline processing is completed, at least print of the SCAN1 region can be executed. Before the start of print of SCAN2 region, second pipeline processing need only have been completed. Before the start of print of SCAN3 region, third pipeline processing need only have been completed. Before the start of print of SCAN4 region, fourth pipeline processing need only have been completed. As described above, if execution of the color degeneration correction table for the target region is completed before the printhead starts moving for print of each region, stop of the printhead is reduced. In addition, the color degeneration correction table can be executed for more regions by assigning priority to each region existing in each SCAN, instead of assigning priority to each region existing in the whole page.

Note that in this embodiment, the upper limit of the number of correctable regions is determined in the unit of head length. However, the upper limit of the number of regions may be determined in a narrower or wider unit. For example, the upper limit of the number of regions may be determined for every scan count of the printhead or by dividing a page into an upper region and a lower region. As the nozzle configuration in the printhead, the widths of the nozzle arrays of the colors may be different in some cases. If colors (nozzle arrays) to be used are clearly determined, the unit to determine the upper limit of the number of regions may be defined in consideration of the widths of the nozzle arrays to be used.

As described above, according to Modification 1, a configuration in which the upper limit of the number of correctable regions is decided not for whole image data but in the unit of head length based on the required speed is employed. If such a configuration is employed, the upper limit count is determined with respect to the number of regions existing in the range of SCAN in the image data. It may therefore be possible to apply color degeneration correction to more regions as compared to the first to third embodiments.

Modification 2

An example in which color degeneration correction tables as many as the number of 3DLUTs can be applied has been described above. However, some of the 3DLUTs may be used in color separation image processing (RGB→CMYK conversion) for image print. For example, one region within the executable correction upper limit count L may be used for color separation image processing, and the number of regions to which the color degeneration correction table can be applied may be set to (L−1). Even if it is assumed that application of the gamut mapping table in step S103 is executed using one of the 3DLUTs, the number of regions to which the color degeneration correction table can be applied is (L−1). Furthermore, if two 3DLUTs are used in color separation and in step S103, the number of regions to which the color degeneration correction table can be applied is (L−2).

In the above description, gamut mapping of step S103 is executed for all regions once, and the color degeneration correction table of step S109 is applied only to a region selected for the execution result. However, the present disclosure is not limited to this. The gamut mapping of step S103 may be executed only step S107 ends with NO. Since the gamut mapping when the determination of step S107 ends with NO is a single kind of table held in advance, it can be considered that one 3DLUT is used (the region-specific color degeneration correction table can be applied to the remaining (L−1) regions). Note that a plurality of types of gamut mapping tables may be held in advance. If Q types of gamut mapping tables are held in advance, and the Q types need to be switched depending on the conditions, the region-specific color degeneration correction table can be applied to (L-Q) regions.

Also, in the above description, the system can be applied to a configuration with a dedicated correction circuit of the 3DLUT. A detailed implementation method is not limited to a dedicated electric circuit. Also, as a common perception, the upper limit of the number of correctable regions is decided based on the number of cores or the cache memory capacity, and if the number exceeds the upper limit, the printhead may stop. Hence, the processing speed and the correction upper limit count L may be set in consideration of the number of cores and the cache memory capacity as well.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-039880, filed Mar. 14, 2023 which is hereby incorporated by reference herein in its entirety.

What is claimed is:

1. An image processing apparatus comprising:

an image obtaining unit configured to obtain image data;

a conversion information obtaining unit configured to obtain first color conversion information applicable to the image data;

a division unit configured to divide the image data into a plurality of region data;

a correction unit configured to correct the first color conversion information to generate second color conversion information; and a processing unit configured to apply, to each of the plurality of region data, color conversion processing based on one of the first color conversion information and the second color conversion information, wherein for each of the plurality of region data, if a color difference between a third color and a fourth color obtained by converting a first color and a second color included in the region data based on the first color conversion information is smaller than a predetermined color difference, the correction unit generates the second color conversion information such that a color difference between a fifth color and a sixth color obtained by converting the first color and the second color based on the second color conversion information becomes larger than the predetermined color difference, and the processing unit applies color conversion processing based on the second color conversion information corresponding to each region data to at least one region data among the plurality of region data, for which the second color conversion information is generated.

2. The apparatus according to claim 1, wherein the first color conversion information is conversion information for converting a color in a first color gamut into a color in a second color gamut in a predetermined color space.

3. The apparatus according to claim 2, wherein the second color gamut is an output color gamut of an image forming apparatus that performs image formation based on image data that has undergone color conversion processing by the processing unit.

4. The apparatus according to claim 1, wherein the correction unit generates the second color conversion information such that the third color and the fifth color are different, and the fourth color and the sixth color are identical.

5. The apparatus according to claim 1, further comprising an upper limit obtaining unit configured to obtain an upper limit L of the number of region data of a target for which the correction unit generates the second color conversion information.

6. The apparatus according to claim 5, wherein the upper limit L is set such that a processing speed of generation processing of the second color conversion information by the correction unit and color conversion processing based on the second color conversion information by the processing unit is not less than a predetermined required speed, and the predetermined required speed is decided based on an image forming speed of an image forming apparatus that performs image formation based on image data that has undergone color conversion processing by the processing unit.

7. The apparatus according to claim 5, wherein the division unit divides the image data into a plurality of region data whose upper limit count is L.

8. The apparatus according to claim 5, further comprising a setting unit configured to set priority of color conversion processing based on the second color conversion information for each of the plurality of region data, wherein if the number of the plurality of region data exceeds the upper limit L, the correction unit generates, in descending order of priority set for each region data, the second color conversion information for at least one region data whose upper limit count is L.

9. The apparatus according to claim 1, wherein the processing unit applies color conversion processing based on the first color conversion information to region data, among the plurality of region data, to which color conversion processing based on the second color conversion information is not applied.

10. The apparatus according to claim 1, wherein the predetermined color difference is a color difference which is smaller than a color difference between the first color and the second color and with which colors are identified as different colors in terms of a visual characteristic.

11. The apparatus according to claim 1, wherein the correction unit selects the first color and the second color from a plurality of colors included in the same hue range in a case where an entire hue is divided into a plurality of hue regions among a plurality of colors included in region data of interest.

12. The apparatus according to claim 11, wherein the first color is a color having a highest lightness in the plurality of colors included in the same hue range, and the second color is a color having a highest chroma in the plurality of colors included in the same hue range.

13. The apparatus according to claim 1, wherein the division unit comprises:

a temporary division unit configured to divide the image data into M region data based on a predetermined condition; and a region setting unit configured to integrate at least two region data each included in the M region data and formed by the same single color into one region data and set the plurality of region data.

14. An image processing method to be executed by an image processing apparatus, comprising:

obtaining image data;

obtaining first color conversion information applicable to the image data;

dividing the image data into a plurality of region data;

correcting the first color conversion information to generate second color conversion information; and applying, to each of the plurality of region data, color conversion processing based on one of the first color conversion information and the second color conversion information, wherein in the correcting, for each of the plurality of region data, if a color difference between a third color and a fourth color obtained by converting a first color and a second color included in the region data based on the first color conversion information is smaller than a predetermined color difference, the second color conversion information is generated such that a color difference between a fifth color and a sixth color obtained by converting the first color and the second color based on the second color conversion information becomes larger than the predetermined color difference, and in the applying, color conversion processing based on the second color conversion information corresponding to each region data is applied to at least one region data among the plurality of region data, for which the second color conversion information is generated.

15. A non-transitory computer-readable recording medium storing a program that, when executed by a computer, causes the computer to perform an image processing method to be executed by an image processing apparatus, comprising:

obtaining image data;

obtaining first color conversion information applicable to the image data;

dividing the image data into a plurality of region data;

correcting the first color conversion information to generate second color conversion information; and applying, to each of the plurality of region data, color conversion processing based on one of the first color conversion information and the second color conversion information, wherein in the correcting, for each of the plurality of region data, if a color difference between a third color and a fourth color obtained by converting a first color and a second color included in the region data based on the first color conversion information is smaller than a predetermined color difference, the second color conversion information is generated such that a color difference between a fifth color and a sixth color obtained by converting the first color and the second color based on the second color conversion information becomes larger than the predetermined color difference, and in the applying, color conversion processing based on the second color conversion information corresponding to each region data is applied to at least one region data among the plurality of region data, for which the second color conversion information is generated.

* * * * *